(12) United States Patent
Aoki

(10) Patent No.: US 9,296,409 B2
(45) Date of Patent: Mar. 29, 2016

(54) VEHICLE STEERING COLUMN SUPPORT STRUCTURE

(75) Inventor: Takayuki Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/702,227

(22) PCT Filed: Jun. 8, 2010

(86) PCT No.: PCT/JP2010/059717
§ 371 (c)(1),
(2), (4) Date: Dec. 5, 2012

(87) PCT Pub. No.: WO2011/155031
PCT Pub. Date: Dec. 15, 2011

(65) Prior Publication Data
US 2013/0076016 A1 Mar. 28, 2013

(51) Int. Cl.
*B62D 1/16* (2006.01)
*B62D 25/14* (2006.01)

(52) U.S. Cl.
CPC .............. *B62D 1/16* (2013.01); *B62D 25/145* (2013.01); *B62D 25/147* (2013.01)

(58) Field of Classification Search
CPC ....... B62D 1/16; B62D 25/145; B62D 25/147
USPC ........... 280/779, 780; 296/70, 72, 73; 180/90, 180/311
See application file for complete search history.

(56) References Cited

U.S. PATENT DOCUMENTS

| 4,274,646 | A | * | 6/1981 | Olligschlager | ...... B62D 25/145 280/779 |
| 4,355,820 | A | * | 10/1982 | Kitagawa et al. | ............. 280/779 |
| 4,671,536 | A | * | 6/1987 | Yoshimura | ........... B62D 25/145 280/779 |
| 4,682,788 | A | * | 7/1987 | Yoshimura | ..................... 280/779 |
| 5,238,286 | A | * | 8/1993 | Tanaka et al. | ................... 296/70 |
| 5,782,136 | A | * | 7/1998 | Witkovsky et al. | ............. 74/492 |
| 5,810,393 | A | * | 9/1998 | Joest et al. | ..................... 280/779 |
| 6,644,690 | B2 | * | 11/2003 | Brownlee et al. | ............. 280/779 |
| 6,668,513 | B2 | * | 12/2003 | Roberts et al. | ................. 296/205 |
| 6,705,672 | B2 | * | 3/2004 | Shikata et al. | ................. 296/208 |
| 6,869,123 | B2 | * | 3/2005 | Marks et al. | ..................... 296/70 |
| 6,877,787 | B2 | * | 4/2005 | Ito et al. | ............................ 296/70 |
| 7,048,082 | B2 | * | 5/2006 | Mori et al. | .................. 180/89.12 |
| 7,234,763 | B2 | * | 6/2007 | Gupta et al. | ................... 296/208 |

(Continued)

FOREIGN PATENT DOCUMENTS

JP  U-63-59773  4/1988
JP  U-05-12367  2/1993

(Continued)

*Primary Examiner* — Barry Gooden, Jr.
(74) *Attorney, Agent, or Firm* — Oliff PLC

(57) ABSTRACT

A vehicle steering column support structure efficiently supports a steering column. A steering support bracket that supports a steering column is fixed to instrument panel reinforcement disposed along the vehicle width direction between left and right front pillars. A floor brace spans between a side portion of a first support member of the steering support bracket and a side wall portion of a floor tunnel portion. A steering brace spans between a side portion of the first support member and a lower portion of the front pillar. Up-down vibration of the steering column can accordingly be supported by axial force of the floor brace and the steering brace.

10 Claims, 15 Drawing Sheets

(56) References Cited

U.S. PATENT DOCUMENTS

| | | | |
|---|---|---|---|
| 7,300,102 B2* | 11/2007 | Gupta et al. | 296/208 |
| 2002/0056982 A1* | 5/2002 | Brownlee | B62D 1/16 280/779 |
| 2002/0130529 A1* | 9/2002 | Takano | 296/70 |
| 2002/0145309 A1* | 10/2002 | Shikata et al. | 296/208 |
| 2003/0193207 A1* | 10/2003 | Ito et al. | 296/72 |
| 2004/0000782 A1* | 1/2004 | Riefe | 280/779 |
| 2004/0212211 A1* | 10/2004 | Beckley et al. | 296/70 |
| 2006/0283643 A1* | 12/2006 | Simonds | B62D 25/145 180/90 |
| 2009/0008956 A1* | 1/2009 | Scheib et al. | 296/70 |
| 2009/0200784 A1* | 8/2009 | Braun et al. | 280/779 |
| 2010/0176262 A1* | 7/2010 | Vican | B62D 25/147 248/250 |
| 2011/0278876 A1* | 11/2011 | Hitz et al. | 296/72 |
| 2013/0134736 A1* | 5/2013 | Kuwabara et al. | 296/72 |
| 2014/0001792 A1* | 1/2014 | Aoki | B62D 21/15 296/193.09 |

FOREIGN PATENT DOCUMENTS

| | | |
|---|---|---|
| JP | U-05-76966 | 10/1993 |
| JP | A-2000-062649 | 2/2000 |
| JP | A-2003-312542 | 11/2003 |
| JP | A-2004-034927 | 2/2004 |
| JP | A-2008-260460 | 10/2008 |
| JP | A-2009-227071 | 10/2009 |
| JP | A-2009-262703 | 11/2009 |

* cited by examiner

VEHICLE STEERING COLUMN SUPPORT STRUCTURE

TECHNICAL FIELD

The present invention relates to a vehicle steering column support structure.

BACKGROUND ART

Generally, steering columns are configured from pipe material, or using sheet material formed into a pipe shape, and are supported through a steering support bracket by instrument panel reinforcement disposed along the vehicle width direction.

For example in the technology disclosed in Japanese Patent Application Laid-Open (JP-A) No. 2009-227071, instrument panel reinforcement configured from pipe material is reinforced by coupling the instrument panel reinforcement and a cowl substantially along the vehicle front-rear direction with a cowl brace, and coupling the instrument panel reinforcement to a vehicle body floor substantially along the vehicle top-bottom direction by two floor braces. Moreover, a steering column is supported by the instrument panel reinforcement through a column bracket.

In the technology disclosed in JP-A No. 2000-62649, instrument panel reinforcement configured from pipe material is reinforced by coupling the instrument panel reinforcement and a cowl along the vehicle front-rear direction with a cowl brace. A steering column is supported by the instrument panel reinforcement through a left and right pair of steering supports.

Patent Document 1: JP-A No. 2009-227071
Patent Document 2: JP-A No. 2000-62649
Patent Document 3: JP-A No. 2003-312542
Patent Document 4: JP-A No. 2004-034927

DISCLOSURE OF INVENTION

Technical Problem

However, the above known technology is a structure in which up-down vibration of the steering column is basically suppressed by "torsion" of the instrument panel reinforcement configured from a pipe member. Accordingly, the optimum cross-section shape of the steering column is inevitably a circular cross-section, with a large diameter and a thickened plate thickness. In other words, supporting load with the torsion of a pipe material is inherently inefficient.

In consideration of the above circumstances, the present invention is directed towards obtaining a vehicle steering column support structure that can efficiently support a steering column.

Solution to Problem

A vehicle steering column support structure according to a first aspect is equipped with instrument panel reinforcement that is disposed along the vehicle width direction between left and right front pillars and to which a steering support bracket is fixed that supports a steering column, and a brace with a top end portion fixed to a rear portion of the steering support bracket and a bottom end portion fixed to a vehicle body floor or a lower portion of the front pillar.

A vehicle steering column support structure according to a second aspect is the first aspect wherein the brace includes a floor brace with a top end portion fixed to a rear portion of the steering support bracket and a bottom end portion fixed to a vehicle width direction central portion of the vehicle body floor, and a steering brace with a top end portion fixed to a rear portion of the steering support bracket and a bottom end portion fixed to a lower portion of the front pillar.

A vehicle steering column support structure according to a third aspect is the second aspect wherein the floor brace includes an upper portion from the top end portion to a top-bottom direction intermediate portion and a lower portion from the top-bottom direction intermediate portion to the bottom end portion, with the upper portion disposed so as to be inclined towards the vehicle width direction outside with respect to the lower portion.

A vehicle steering column support structure according to a fourth aspect is any one out of the first aspect to the third aspect wherein the instrument panel reinforcement is configured as a pressed structural body with a square cross-section divided into two.

A vehicle steering column support structure according to a fifth aspect is the fourth aspect wherein the pressed structural body includes a rear-coupling flange portion that is front-rear superimposed and extends towards the vehicle bottom side, and a front-coupling flange portion that is top-bottom superimposed and extends towards the vehicle front side.

A vehicle steering column support structure according to a sixth aspect is the fifth aspect wherein the pressed structural body is spot welded respectively at the rear-coupling flange portion and at the front-coupling flange portion.

A vehicle steering column support structure according to a seventh aspect is any one aspect of the fourth aspect to the sixth aspect wherein attachment brackets that are L-shaped in plan view are respectively fixed to both length direction end portions of the pressed structural body, and the attachment brackets are fastened and fixed to the front pillars from the vehicle rear side.

A vehicle steering column support structure according to an eighth aspect is any one aspect of the fourth aspect to the seventh aspect wherein joining flange portions that overlap with the upper face of the pressed structural body are respectively formed at both side portions of the steering support bracket, and the joining flange portions are fixed to the upper face of the pressed structural body.

A vehicle steering column support structure according to a ninth aspect is any one aspect of the first aspect to the eighth aspect wherein the pressed structural body further includes an upper member configuring an upper section side of the square cross-section and a lower member configuring a lower section side of the square cross-section, and the steering support bracket includes a first support member that is fixed to the upper member, and a second support member that is fixed to the lower member and extends towards the first support member side and is fixed to the first support member.

A vehicle steering column support structure according to a tenth aspect is any one aspect of the first aspect to the ninth aspect wherein the steering support bracket and a cowl are coupled in the vehicle front-rear direction by a cowl brace, an attachment portion of the cowl brace to the steering support bracket is formed in a plate shape and disposed overlapping the upper face of the steering support bracket, and the steering column is fastened and fixed employing a stud bolt that extends downwards from the attachment portion.

A vehicle steering column support structure according to an eleventh aspect is either the second aspect or the third aspect wherein a knee restraint bracket with a knee restraint face extending along the vehicle top-bottom direction is attached to a top-bottom direction intermediate portion of the floor brace and to a top-bottom direction intermediate portion of the steering brace.

A vehicle steering column support structure according to a twelfth aspect is the first aspect wherein the brace includes a first floor brace with a top end portion fixed to the instrument panel reinforcement and a bottom end portion fixed to a vehicle width direction central portion of the vehicle body floor, a steering brace with a top end portion fixed to a rear portion of the steering support bracket and a bottom end portion fixed to a lower portion of the front pillar, and a second floor brace with a top end portion fixed to a rear portion of the steering support bracket and a bottom end portion fixed to a top-bottom direction mid-way location of the first floor brace.

According to the first aspect, the steering support bracket is fixed to the instrument panel reinforcement, and the steering column is supported by the steering support bracket.

The present aspect includes the brace with the top end portion fixed to a rear portion of the steering support bracket, and the bottom end portion fixed to the vehicle body floor or a lower portion of the front pillar. Up-down vibration of the steering column can accordingly be supported by axial force of the brace through the steering support bracket. The support rigidity demanded from the instrument panel reinforcement can be lowered, since torsion force input to the instrument panel reinforcement is reduced. As a result, there is no need for the instrument panel reinforcement to have a circular cross-section with a thick plate thickness and a large diameter as hitherto. The instrument panel reinforcement can accordingly be configured with a thin plate thickness and lightweight square cross-section. The support efficiency of the instrument panel reinforcement with respect to up-down vibration of the steering column is accordingly greatly improved.

According to the second aspect, the brace includes the floor brace and the steering brace, with the top end portions of both fixed to rear portions of the steering support bracket. Up-down vibration of the steering column can accordingly be supported by both the axial force of the floor brace and the axial force of the steering brace.

According to the third aspect, the floor brace includes the upper portion and the lower portion, with the upper portion disposed so as to be inclined towards the vehicle width direction outside with respect to the lower portion. Pedal work space is therefore not sacrificed in comparison to cases wherein the floor brace is formed in a straight line shape and disposed such that the floor brace is inclined overall.

According to the fourth aspect, as described above, there is no need to configure the instrument panel reinforcement with a circular cross-section, and the plate thickness can be made thinner, since up-down vibration of the steering column is supported by the axial force of the brace. Accordingly, configuration with the pressed structural body with a square cross-section of the present aspect is possible, and a reduction in weight and a large saving in material costs can be achieved.

Moreover, since flat faces can be secured by employing a square cross-section, peripheral components can be fixed with good precision. Various brackets required when instrument panel reinforcement with a circular cross-section is employed can be dispensed with. It is possible to attach stud bolts or weld nuts to the instrument panel reinforcement and attach peripheral components to the instrument panel reinforcement directly. The number of components can accordingly be reduced.

According to the fifth aspect, the pressed structural body includes the rear-coupling flange portion that is front-rear superimposed and extends towards the vehicle bottom side, and the front-coupling flange portion that is top-bottom superimposed and extends towards the vehicle front side. It is accordingly possible to employ these coupling flange portions for fixing peripheral components (for example a HVAC), unlike when fitting with stud bolts and weld nuts as described above.

According to the sixth aspect, the pressed structural body is spot welded at the rear-coupling flange portion and at the front-coupling flange portion. Welding is therefore exceptionally straightforward in comparison to cases employing instrument panel reinforcement formed with a circular cross-section by bending a sheet material into a pipe shape and continuously welding (seam welding) joining portions.

According to the seventh aspect, the instrument panel reinforcement is fixed to the front pillars by fastening and fixing the attachment brackets at both length direction end portions of the pressed structural body that are L-shaped in plan view to the front pillars from the vehicle rear side. Hitherto, in configurations whereby up-down vibration of the steering column was supported by the torsional rigidity of a pipe material, fastening and fixing to the front pillars was necessary at least at three locations so as to surround the pipe material in the circumferential direction. However, according to the present aspect, the required attachment strength can be secured even if the pressed structural body is fastened and fixed to the front pillars at a small number of coupling points, since the up-down vibration of the steering column is not supported by torsional rigidity of the instrument panel reinforcement.

According to the eighth aspect, cross-sectional collapse of the instrument panel reinforcement is suppressed and the rigidity of the instrument panel reinforcement raised since the joining flange portions formed at the two edge portions of the steering support bracket are superimposed with and fixed to the upper face of the pressed structural body.

According to the ninth aspect, the steering support bracket is divided into the first support member that is fixed to the upper member of the pressed structural body, and the second support member that is fixed to the lower member of the pressed structural body. Accordingly the first support member can be pre-attached to the upper member and the second support member can be pre-attached to the lower member before configuring the pressed structural body. As a result, the attachment precision of the first support member to the upper member and the attachment precision of the second support member to the lower member can be raised.

Moreover, when joining the upper member and the lower member together, the second support member can be fixed to the first support member and the two coupled together by the second support member extending to the first support member side. The first support member and the second support member are thereby directly coupled together. The overall rigidity of the steering support bracket is therefore increased.

According to the tenth aspect, the steering support bracket and the cowl are coupled in the vehicle front-rear direction by the cowl brace. The support rigidity of the steering column can therefore be increased. In the present aspect, the attachment portion of the cowl brace to the steering support bracket is formed in a plate shape and the plate shaped attachment portion is disposed overlapping the upper face of the steering support bracket. The stud bolt extends downwards from the attachment portion and steering column is fastened and fixed using the stud bolt. The plate thickness of portion fastened and fixed to the steering column thereby has a double thickness of the plate thickness of the steering support bracket and the plate thickness of the attachment portion of the cowl brace, thus increasing the plate thickness. The plane rigidity of the attachment portion to the steering column is thereby increased.

According to the eleventh aspect, the knee restraint bracket with the knee restraint face extending along the vehicle top-bottom direction is attached to the top-bottom direction intermediate portion of the floor brace and to the top-bottom direction intermediate portion of the steering brace. The vehicle front-rear direction length of the knee restraint bracket can therefore be shortened in comparison to cases in which a knee restraint bracket is attached to the instrument panel reinforcement. In other words, a shorter length direction (substantially the vehicle front-rear direction) length of the knee restraint bracket suffices, since the attachment point of the knee restraint bracket to the vehicle body side can be set further towards the vehicle rear side than hitherto. As a result, it becomes more difficult for the knee restraint face of the knee restraint bracket to shear (escape) in the vehicle top-bottom direction when the knee restraint bracket restrains the knees of an occupant.

According to the twelfth aspect, the brace includes the first floor brace of known technology, and the second floor brace with the top end portion fixed to the rear portion of the steering support bracket and the bottom end portion fixed to the top-bottom direction mid-way location of the first floor brace and the steering brace. In other words, it could be said that this configuration replaces the configuration with the upper portion and the lower portion described above in the third aspect with two floor braces. This configuration can accordingly also secure pedal work space.

Advantageous Effects of Invention

As described above, the vehicle steering column support structure according to the first aspect exhibits the excellent advantageous effect of being able to efficiently support the steering column.

The vehicle steering column support structure according to the second aspect exhibits the excellent advantageous effect of being able to secure adequate support rigidity with respect to up-down vibration of the steering column.

The vehicle steering column support structure according to the third aspect exhibits the excellent advantageous effect of being able to secure good pedal operability.

The vehicle steering column support structure according to the fourth aspect exhibits the excellent advantageous effect of being able to achieve a reduction in weight and a large cost saving.

The vehicle steering column support structure according to the fifth aspect exhibits the excellent advantageous effect of being able to bring benefits to the attachment method of peripheral components to the instrument panel reinforcement in the sense that it is possible to employ the coupling flange portions in the attachment of peripheral components.

The vehicle steering column support structure according to the sixth aspect exhibits the excellent advantageous effect of being able to make large savings in welding cost and welding inspection cost.

The vehicle steering column support structure according to the seventh aspect exhibits the excellent advantageous effect of being able to increase productivity in the attachment of the instrument panel reinforcement to the front pillars.

The vehicle steering column support structure according to the eighth aspect exhibits the excellent advantageous effect of being able to suppress cross-sectional collapse of the instrument panel reinforcement and increase the rigidity of the instrument panel reinforcement.

The vehicle steering column support structure according to the ninth aspect exhibits the excellent advantageous effect of being able to raise the attachment precision of the steering column to the steering support bracket, and increase the support rigidity of the steering support bracket.

The vehicle steering column support structure according to the tenth aspect exhibits the excellent advantageous effect of being able to increase the support rigidity of the steering column.

The vehicle steering column support structure according to the eleventh aspect exhibits the excellent advantageous effect of being able to achieve a reduction in size of the knee restraint bracket, and enhancing occupant knee restraint performance.

The vehicle steering column support structure according to the twelfth aspect exhibits the excellent advantageous effect of being able to secure good pedal operability.

BEST MODE FOR CARRYING OUT THE INVENTION

Figure 1:
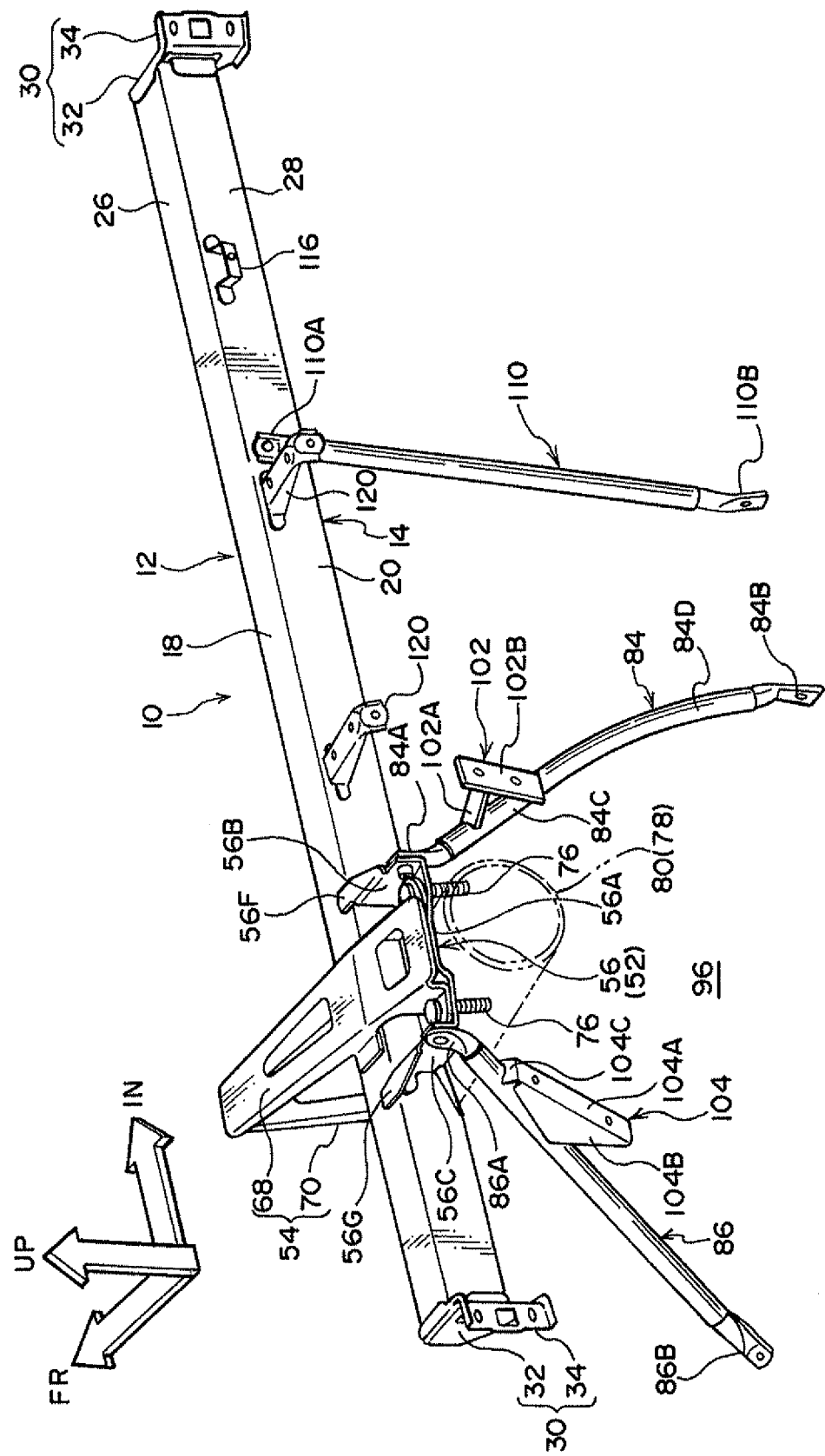
FIG. 1 is an overall perspective view illustrating instrument panel reinforcement applied with a vehicle steering column support structure according to a present exemplary embodiment.

Explanation follows regarding an exemplary embodiment of a vehicle steering column support structure according to the present invention, with reference to FIG. 1 to FIG. 15. Note that in the drawings, as appropriate the arrow FR indicates the vehicle front side, the arrow UP indicates the vehicle top side and the arrow IN indicates the vehicle width direction inside.

As illustrated in FIG. 1, instrument panel reinforcement 10 is configured by a pressed structural body 12 with a square cross-section, divided into two parts along a diagonal line. More specifically, as illustrated in for example FIG. 5 to FIG. 9, the pressed structural body 12 is configured from two components: an upper member 14 and a lower member 16, each configured by press forming and formed with an L-shaped cross-section.

The upper member 14 configures an upper section side of the square cross-section, and is provided with an upper face portion 18 and a rear face portion 20. The lower member 16 configures a lower section side of the square cross-section, and is provided with a front face portion 22 and a lower face portion 24. An upper edge portion of the front face portion 22 is bent towards the vehicle front side, configuring a lower side front-coupling flange portion 22A. A rear edge portion of the lower face portion 24 is bent towards the vehicle bottom side, configuring a lower side rear-coupling flange portion 24A. The lower side front-coupling flange portion 22A is superimposed in the top-bottom direction with an upper side front-coupling flange portion 18A that is a front edge portion of the upper face portion 18 of the upper member 14, and the two are joined together in this state by spot welding (hereafter, when it is not necessary to distinguish between the lower side front-coupling flange portion 22A and the upper side front-coupling flange portion 18A, they are referred to as the "front-coupling flange portion 26"). The lower side rear-coupling flange portion 24A is superimposed in the front-rear direction with an upper side rear-coupling flange portion 20A that is a lower edge portion of the rear face portion 20 of the upper member 14, and the two are joined together in this state by spot welding (hereafter, when it is not necessary to distinguish between the lower side rear-coupling flange portion 24A and the upper side rear-coupling flange portion 20A, they are referred to as the "rear-coupling flange portion 28"). The pressed structural body 12 with a square cross-section is thus formed.

As illustrated in FIG. 1 and in FIG. 5 to FIG. 8, attachment brackets 30 formed with an L-shape in plan view are attached to both length direction end portions of the pressed structural body 12. The attachment brackets 30 are manufactured by press forming. The attachment brackets 30 are each provided with a base portion 32 that closes off the square cross-sections formed at the length direction end portions of the pressed structural body 12, and an attachment portion 34 formed by bending a rear end portion of the base portion 32 towards the vehicle width direction outside.

Figure 5:
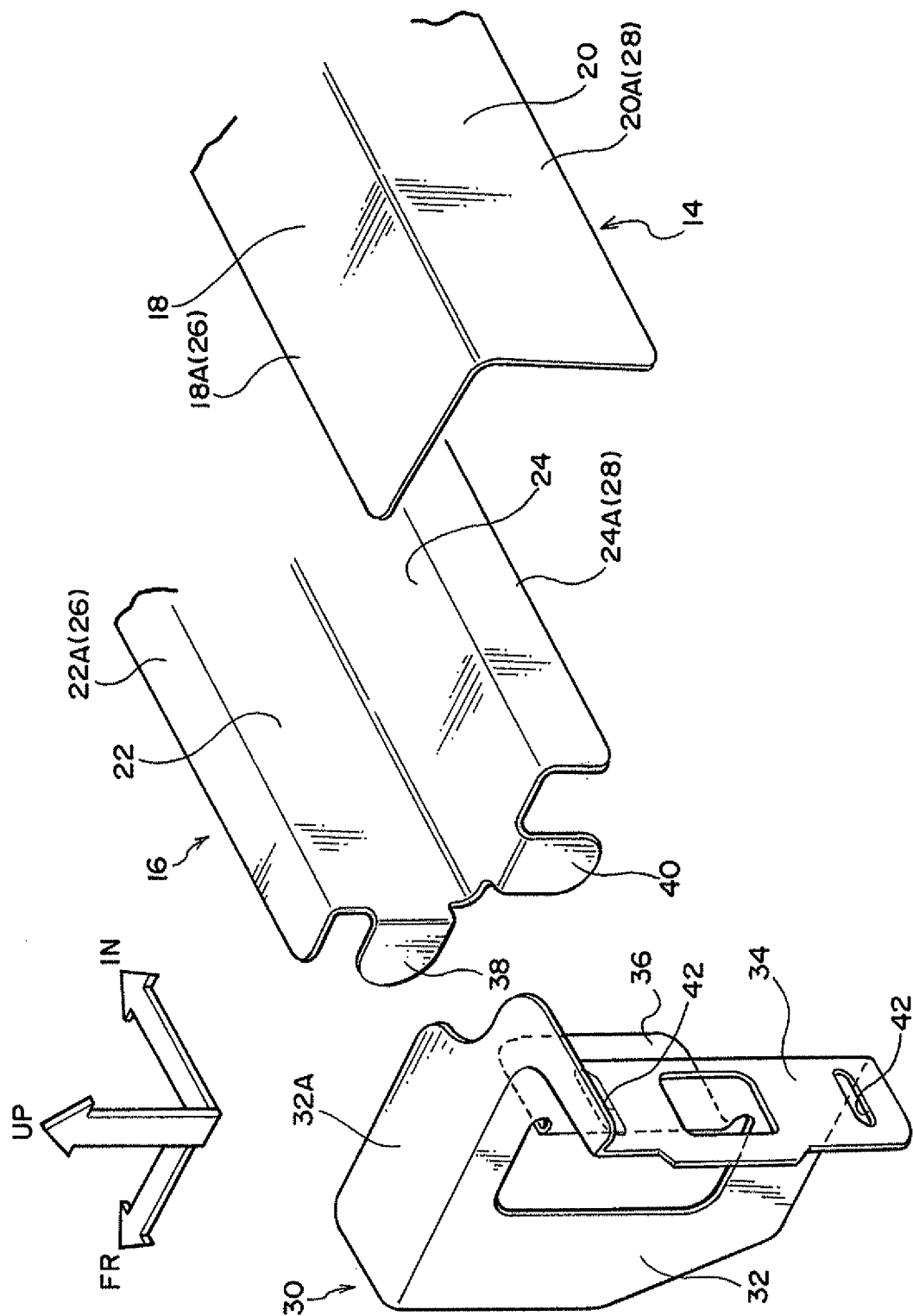
FIG. 5 is an enlarged exploded perspective view illustrating a structure of a length direction end portion of the instrument panel reinforcement illustrated in FIG. 1.
Figure 8:
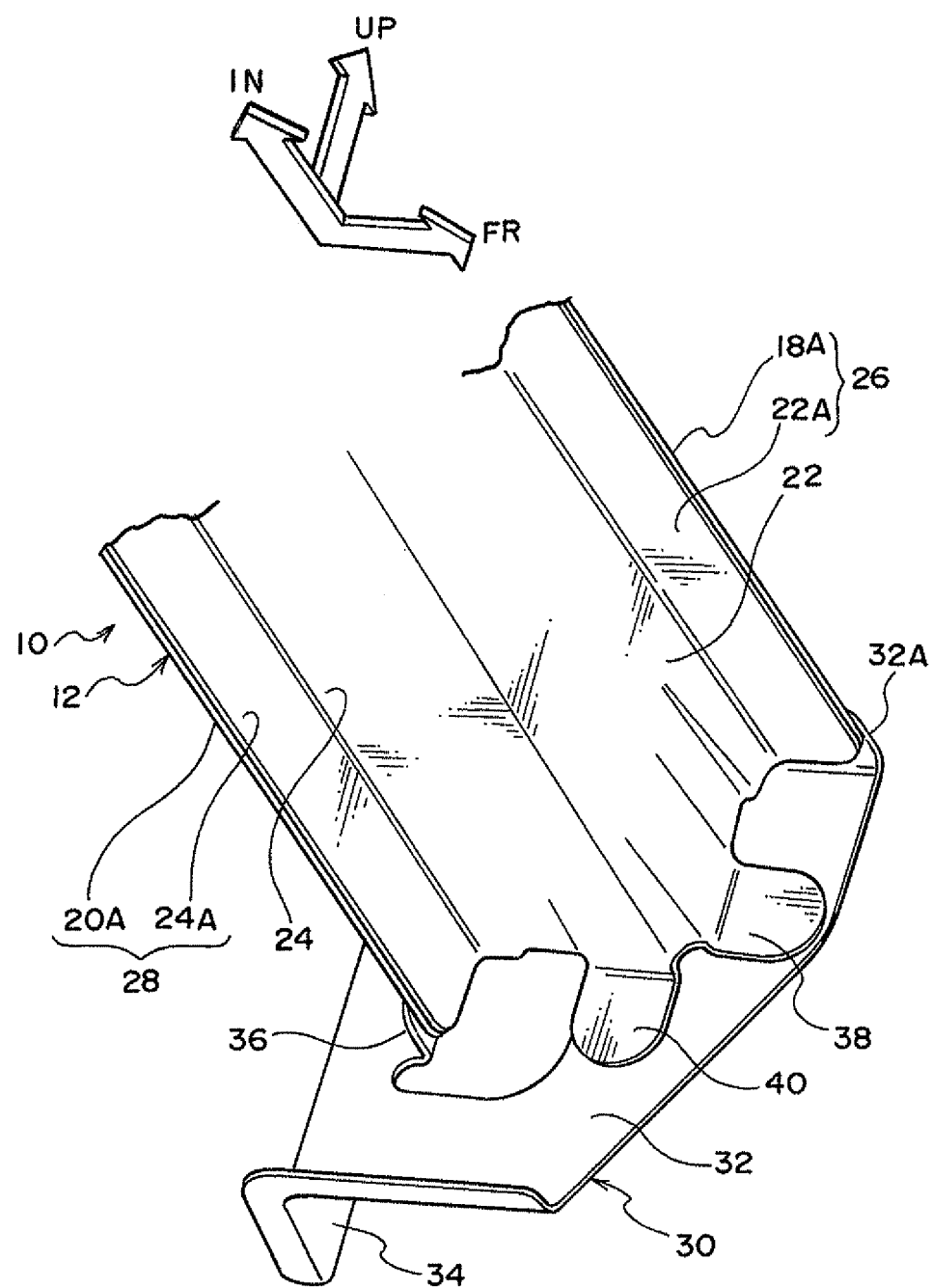
FIG. 8 is an enlarged perspective view illustrating a joining structure of the instrument panel reinforcement and the attachment bracket illustrated in FIG. 7, as seen from the vehicle bottom side.

A bent flange portion 36 bent towards the side of the rear face portion 20 of the pressed structural body 12 is formed by cutting and pushing out a central portion of the base portions 32. The bent flange portion 36 is superimposed with the rear face portion 20 from the vehicle rear side, and the two are spot welded together in this state. Upper edge portions and lower edge portions of the base portion 32 and the attachment portion 34 are bent around to right angles in the same direction, thereby reinforcing the brackets 30. An upper edge flange portion 32A formed to the upper edge portion of the base portion 32 juts out towards the vehicle width direction inside. The upper edge flange portions 32A are superimposed with the upper face portion 18 of the pressed structural body 12 from the vehicle top side, and the two are spot welded together in this state. As illustrated in FIG. 5 and FIG. 8, length direction end portions of the lower member 16 are each integrally formed with a pair of a front side attachment tab 38 and a lower side attachment tab 40. The front side attachment tab 38 is formed by bending a length direction end portion of the front face portion 22 towards the vehicle front side. The lower side attachment tab 40 is formed by bending a length direction end portion of the lower face portion 24 towards the vehicle bottom side. The front side attachment tab 38 and the lower side attachment tab 40 are superimposed with the vehicle width direction inside face of the base portion 32, and are spot welded to the base portion 32 in this state.

Figure 6:
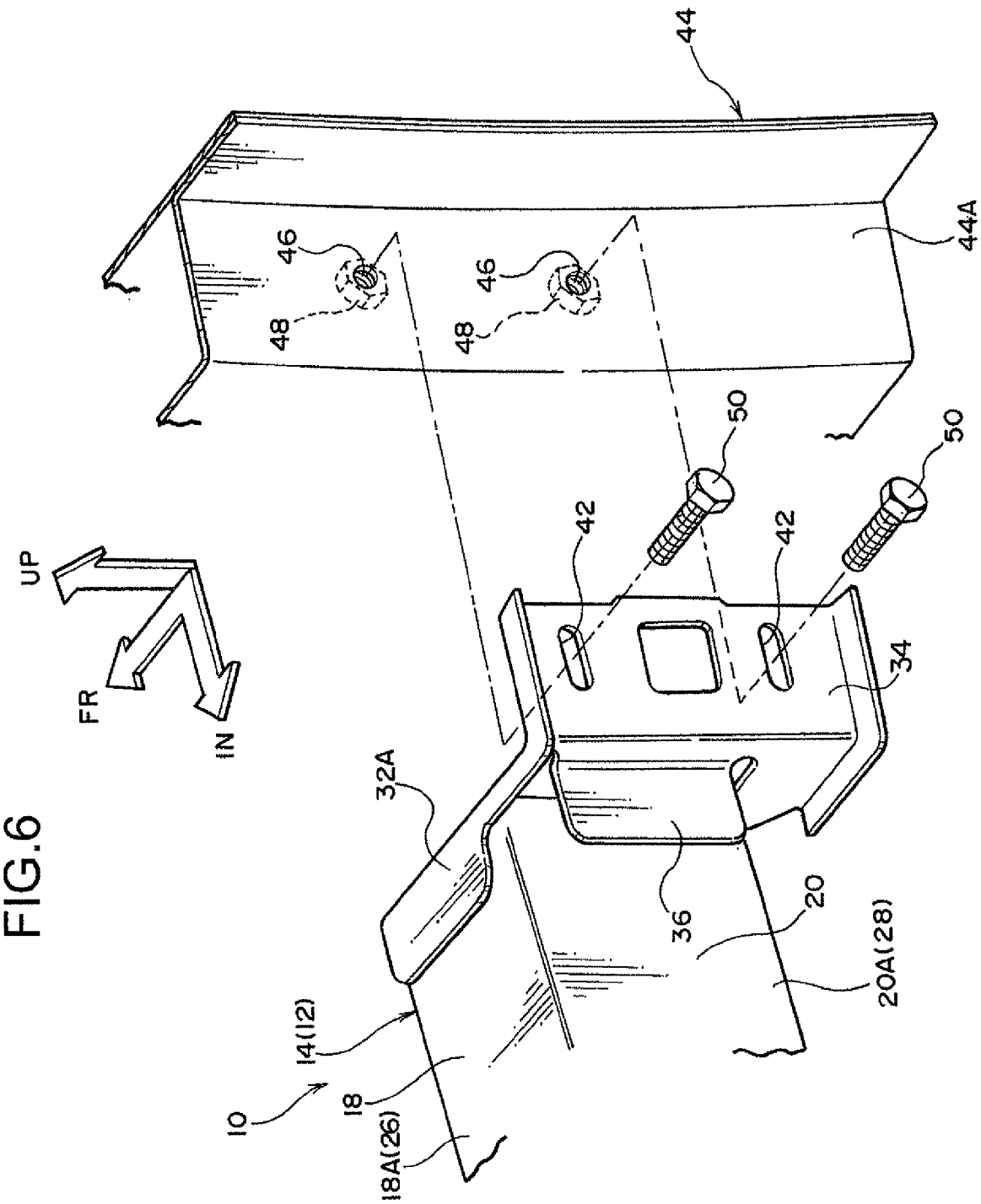
FIG. 6 is an enlarged perspective view illustrating an attachment structure of an instrument panel reinforcement passenger seat side attachment bracket to a front pillar, as seen from a vehicle compartment inside.
Figure 7:
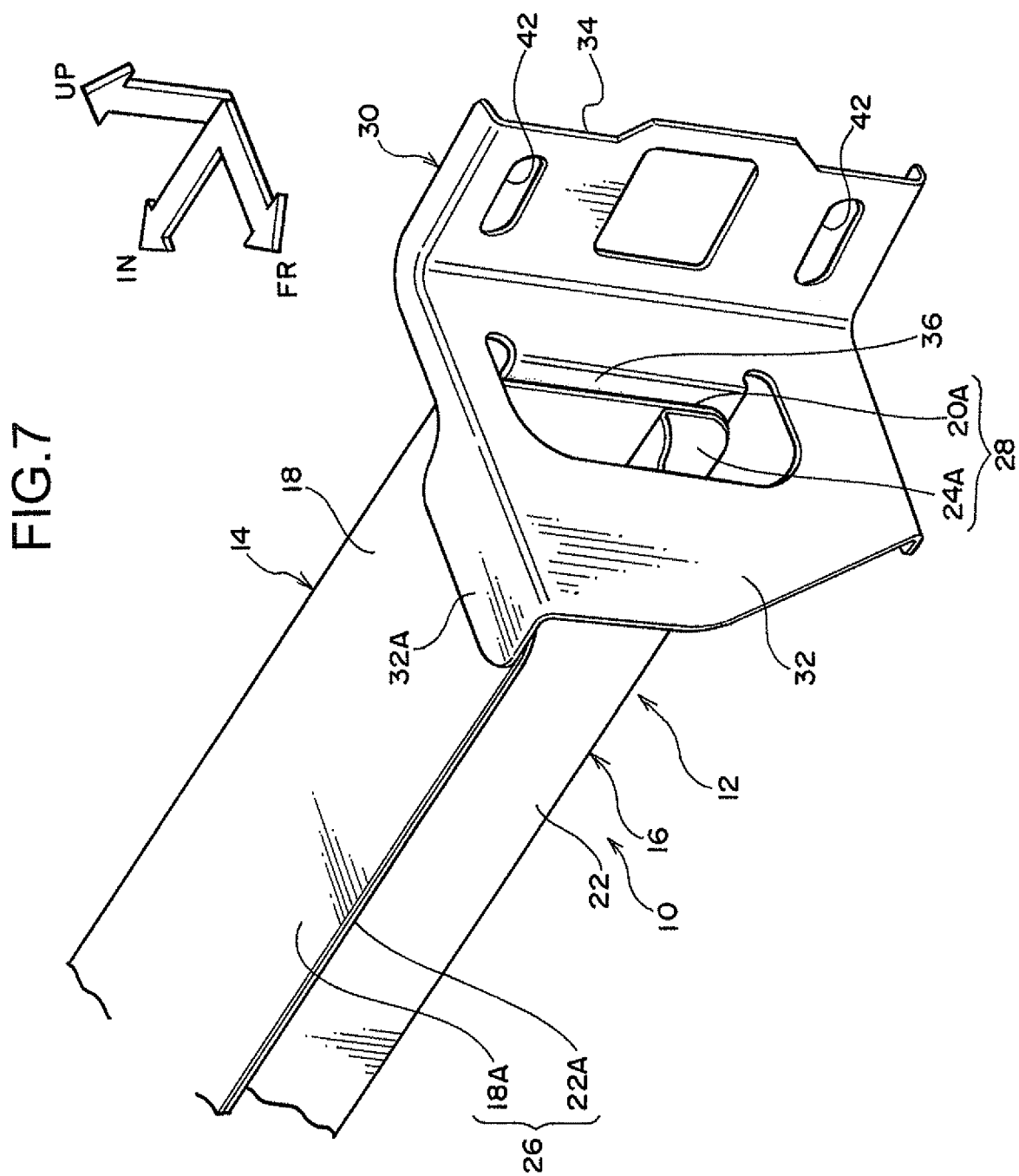
FIG. 7 is an enlarged perspective view illustrating an instrument panel reinforcement driving seat side attachment bracket as seen from outside (the door mirror side).

An upper portion and a lower portion of the attachment portion 34 are formed with a top and bottom pair of bolt insertion holes 42 as elongated holes with length in the vehicle width direction. As illustrated in FIG. 6, a corresponding top and bottom pair of bolt insertion holes 46, configured as circular holes at positions corresponding to the top and bottom bolt insertion holes 42, are formed through rear wall portions 44A of left and right front pillars 44. Note that weld nuts 48 are welded to the front faces of the rear wall portions 44A, coaxially to the bolt insertion holes 46. The attachment portion 34 is superimposed from the vehicle rear side against the rear wall portion 44A of the front pillar 44, and the instrument panel reinforcement 10 is fastened and fixed to the left and right front pillars 44 by screwing bolts 50 into the weld nuts 48 through the top and bottom pairs of the bolt insertion holes 42, 46.

Figure 2:
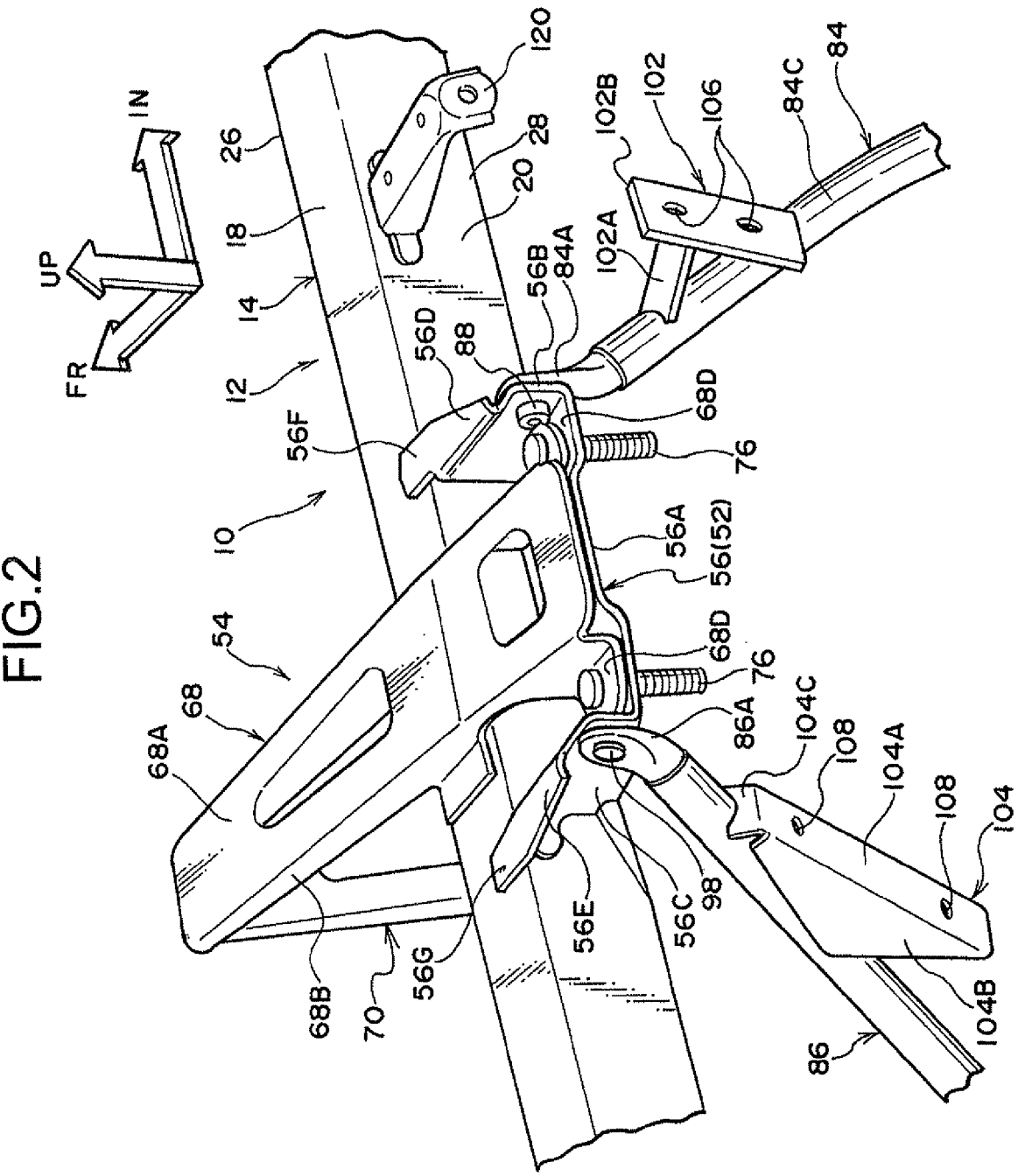
FIG. 2 is an enlarged perspective view, focusing on the steering support bracket illustrated in FIG. 1.
Figure 3:
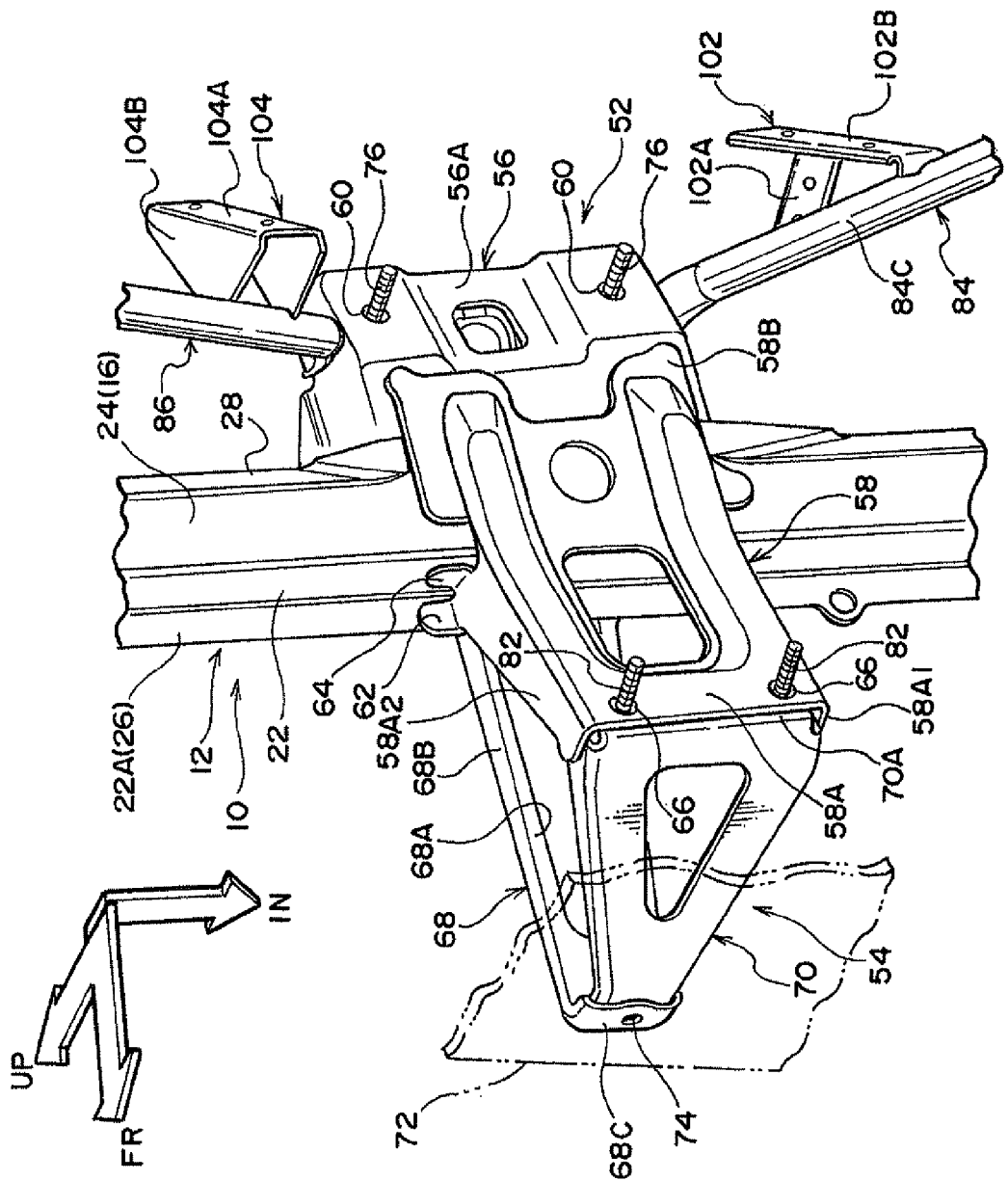
FIG. 3 is an enlarged cross-section of the steering support bracket illustrated in FIG. 2, as seen from the back face side.

As illustrated in FIG. 1 to FIG. 4, a steering support bracket 52 and a cowl brace 54 are attached to the driver's seat side of the instrument panel reinforcement 10 described above. The steering support bracket 52 is configured only at a lower side. In other words, an upper side of the steering support bracket 52 is dispensed with. More specifically, as illustrated in FIG. 2 and FIG. 3, the steering support bracket 52 is configured from a first support member 56 fixed to the upper member 14 side of the pressed structural body 12, and a second support member 58 fixed to the lower member 16 side of the pressed structural body 12. Both the first support member 56 and the second support member 58 are manufactured by press forming.

The first support member 56 is formed in a substantially U-shape open towards the vehicle top side, and is equipped with a bottom portion 56A that extends in the vehicle width direction, and side portions 56B, 56C on either side formed by bending both vehicle width direction edge portions of the bottom portion 56A towards the vehicle top side. The two sides of the bottom portion 56A are a step lower than a central portion of the bottom portion 56A, and are respectively formed with a left and right pair of bolt insertion holes 60 (see FIG. 3). Upper edge portions of both the side portions 56B, 56C are respectively bent in directions heading away from each other, forming upper edge flange portions 56D, 56E. The upper edge flange portions 56D, 56E extend towards the vehicle front side, and these extension portions 56F, 56G are superimposed from the vehicle top side on the upper face portion 18 of the upper member 14 and spot welded thereto.

As illustrated in FIG. 3, the second support member 58 is formed with an overall plate shape. Both vehicle width direction edge portions of a front portion 58A of the second support member 58 are bent towards the vehicle top side, configuring side portions 58A1, 58A2. The front portion 58A is accordingly formed substantially in a U-shape open towards the vehicle top side, similarly to the first support member 56. Rear edge upper corner portions of both the side portions 58A1, 58A2 are each formed with a pair of an upper side attachment tab 62 and a lower side attachment tab 64. The upper side attachment tabs 62 are spot welded to the lower side front-coupling flange portion 22A of the lower member 16. The lower side attachment tabs 64 are spot welded to the front face portion 22 of the lower member 16. A front end portion of the front portion 58A is further formed with a left and right pair of bolt insertion holes 66. A rear portion 58B of the second support member 58 extends towards the first support member 56 side and is spot welded to the first support member 56. The first support member 56 and the second support member 58 are accordingly coupled together to form a single unit.

The cowl brace 54 is formed in an inverted V-shape in side-view, and is configured from an upper portion 68 disposed so as to straddle the pressed structural body 12 at the vehicle top side, and a lower portion 70 that extends down towards the vehicle bottom side from a front end portion of the upper portion 68 and is disposed to the vehicle front side of the pressed structural body 12. Both the upper portion 68 and the lower member 16 are manufactured by press forming.

The upper portion 68 is provided with a main body portion 68A formed in a substantially rectangular shape in plan view, and both side portions 68B formed by bending both vehicle width direction edge portions of the main body portion 68A towards the vehicle bottom side. The upper portion 68 is formed with an inverted U-shaped cross-section open towards the vehicle bottom side. A front end portion of the main body portion 68A is bent towards the vehicle bottom side, and this front end flange 68C is formed with a bolt insertion hole 74 for fastening and fixing the front end flange 68C to a cowl 72 with a bolt. As illustrated in FIG. 2, rear end portions of the both side portions 68B are bent in directions heading away from each other in the vehicle width direction, to configure a pair of attachment flanges 68D. The pair of attachment flanges 68D are superimposed with the upper faces at the two sides of the bottom portion 56A of the first support member 56, described above. An attachment bolt 76, pointing downwards, is fixed to each of the attachment flanges 68D. The attachment bolts 76 are inserted into the bolt insertion holes 60 (see FIG. 3) formed at the two sides of the bottom portion 56A of the first support member 56, and are fastened and fixed to a column side attachment bracket fixed to a column tube 80 of a steering column 78 (see FIG. 1).

The lower portion 70 is formed in a substantially isosceles triangle shape as viewed from the vehicle front side. Each side of the lower portion 70 is reinforced by bending around towards the vehicle rear side. A lower flange 70A formed by bending a bottom edge portion of the lower portion 70 towards the vehicle rear side is superimposed with the upper face of the front portion 58A of the second support member 58. A left and right pair of attachment bolts 82 are fixed downwards into the lower flange 70A. The attachment bolts 82 are inserted into the bolt insertion holes 66 formed in the front portion 58A of the second support member 58 and are fastened and fixed to the column side attachment bracket fixed to the column tube 80 of the steering column 78. The steering column 78 is accordingly fastened and fixed to the first support member 56 and the second support member 58.

Explanation follows regarding a floor brace 84 and a steering brace 86. As illustrated in FIG. 1 to FIG. 4, the floor brace 84 and the steering brace 86 are attached to the first support member 56 of the steering support bracket 52, described above, such that the first support member 56 is positioned between the two in the vehicle width direction.

The floor brace 84 is configured from pipe material, and is squashed flat at a top end portion 84A and a bottom end portion 84B for ease of fixing. The floor brace 84 is also formed with a shape that curves at a top-bottom direction intermediate portion as viewed from the interior side. More specifically, the floor brace 84 is configured from an upper portion 84C from the top end portion 84A to the top-bottom direction intermediate portion, and a lower portion 84D from the top-bottom direction intermediate portion to the bottom end portion 84B. The top end portion 84A is fastened and fixed to the vehicle width direction inside side portion 56B of the first support member 56 by a fastening 88 configured by a bolt and a weld nut. The bottom end portion 84B is fastened and fixed by a fastening 94, configured by a bolt and a weld nut, to a side wall portion 92A (see FIG. 4) of a floor tunnel portion 92 provided in a saddle shape at a vehicle width direction central portion of a vehicle body floor 90. The upper portion 84C is inclined towards the vehicle width direction outside with respect to the lower portion 84D. Pedal work space 96 (see FIG. 4) is accordingly secured.

The steering brace 86 is configured from pipe material, and is squashed flat at a top end portion 86A and a bottom end portion 86B for ease of fixing. The steering brace 86 is further formed in a straight line shape. The top end portion 86A is fastened and fixed by a fastening 98, configured by a bolt and a weld nut, to the vehicle width direction outside side portion 56C of the first support member 56. The bottom end portion 86B is fastened and fixed to a height direction intermediate portion of the front pillar 44 by a fastening 100 configured by a bolt and a weld nut (see FIG. 4). As a result, the steering brace 86 is inclined such that the position of the top end portion 86A is higher than the position of the bottom end portion 86B as viewed from the interior side.

A left and right pair of knee restraint brackets 102, 104 are attached respectively to the upper portion 84C of the floor brace 84 and to an upper portion of the steering brace 86. The knee restraint bracket 102 disposed on the floor brace 84 side is configured from a narrow rectangular plate shaped support portion 102A, having a base end portion fixed so as to be substantially perpendicular to the upper portion 84C of the floor brace 84 and a leading end portion extending towards the vehicle rear side, and a rectangular flat plate shaped knee restraint face 102B, having an upper portion rear face fixed so as to be substantially perpendicular to the leading end portion of the support portion 102A and a lower end portion fixed to the upper portion 84C of the floor brace 84. The knee restraint face 102E extends substantially in the vehicle top-bottom direction. The knee restraint face 102B is formed with a top and bottom pair of bolt insertion holes 106, and an energy absorbing member, not shown in the drawings, is attached using the bolt insertion holes 106.

The knee restraint bracket 104 disposed on the steering brace 86 side is manufactured by press forming. More specifically, the knee restraint bracket 104 is configured by a knee restraint face 104A formed in a narrow rectangular plate shape, a left and right pair of side wall portions 104B formed by bending the long sides of the knee restraint face 104A towards the vehicle front side, and an upper end wall 104C formed by bending the upper side short side of the knee restraint face 104A towards the vehicle front side. The left and right pair of side wall portions 104B and the upper end wall 104C are fixed to the steering brace 86. The knee restraint face 104A extends along the vehicle top-bottom direction and is formed with a top and bottom pair of bolt insertion holes 108 for attaching an energy absorbing member, not shown in the drawings.

Figure 9:
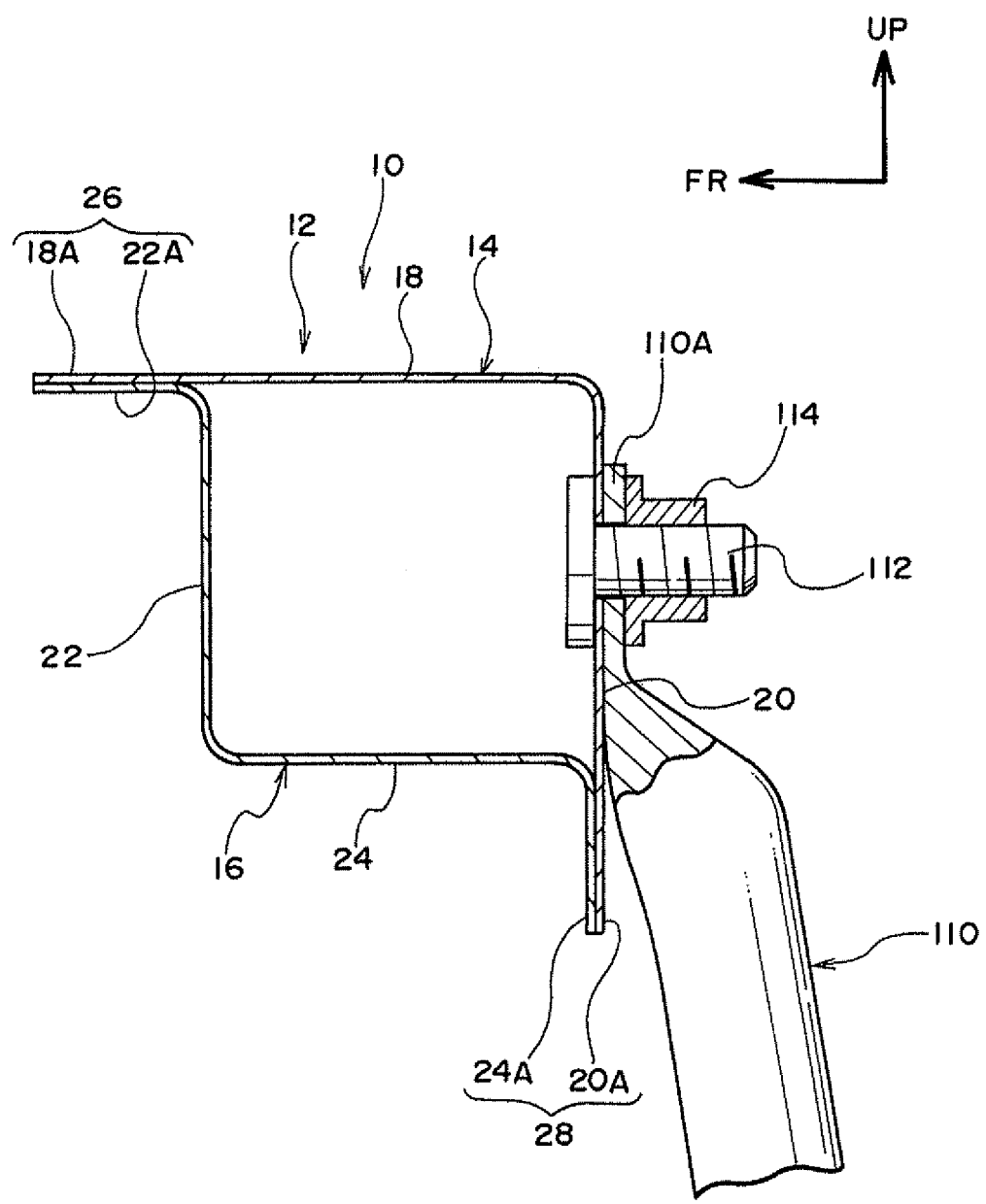
FIG. 9 is an enlarged vertical cross-section illustrating an attachment structure of a floor brace disposed on a passenger seat side to instrument panel reinforcement, in a partially cut-away state.

Lastly, explanation is given regarding the cross-sectional structure of each portion of the instrument panel reinforcement 10. As illustrated in FIG. 1, a passenger seat floor brace 110 is disposed to the passenger seat side of the instrument panel reinforcement 10 described above. The passenger seat floor brace 110 is formed in a straight line shape, and an upper end portion 110A of the passenger seat floor brace 110 is fastened and fixed to the rear face portion 20 of the upper member 14. More specifically, as illustrated in FIG. 9, a projection bolt 112 is provided to the rear face portion 20 extending towards the vehicle rear side. The upper end portion 110A of the passenger seat floor brace 110 is directly fastened and fixed to the rear face portion 20 by inserting the projection bolt 112 through the upper end portion 110A and screwing on a nut 114. Note that a lower end portion 110B of the passenger seat floor brace 110 is fastened and fixed to a side wall portion 92B on the passenger seat side of the floor tunnel portion 92 mentioned above.

Figure 10:
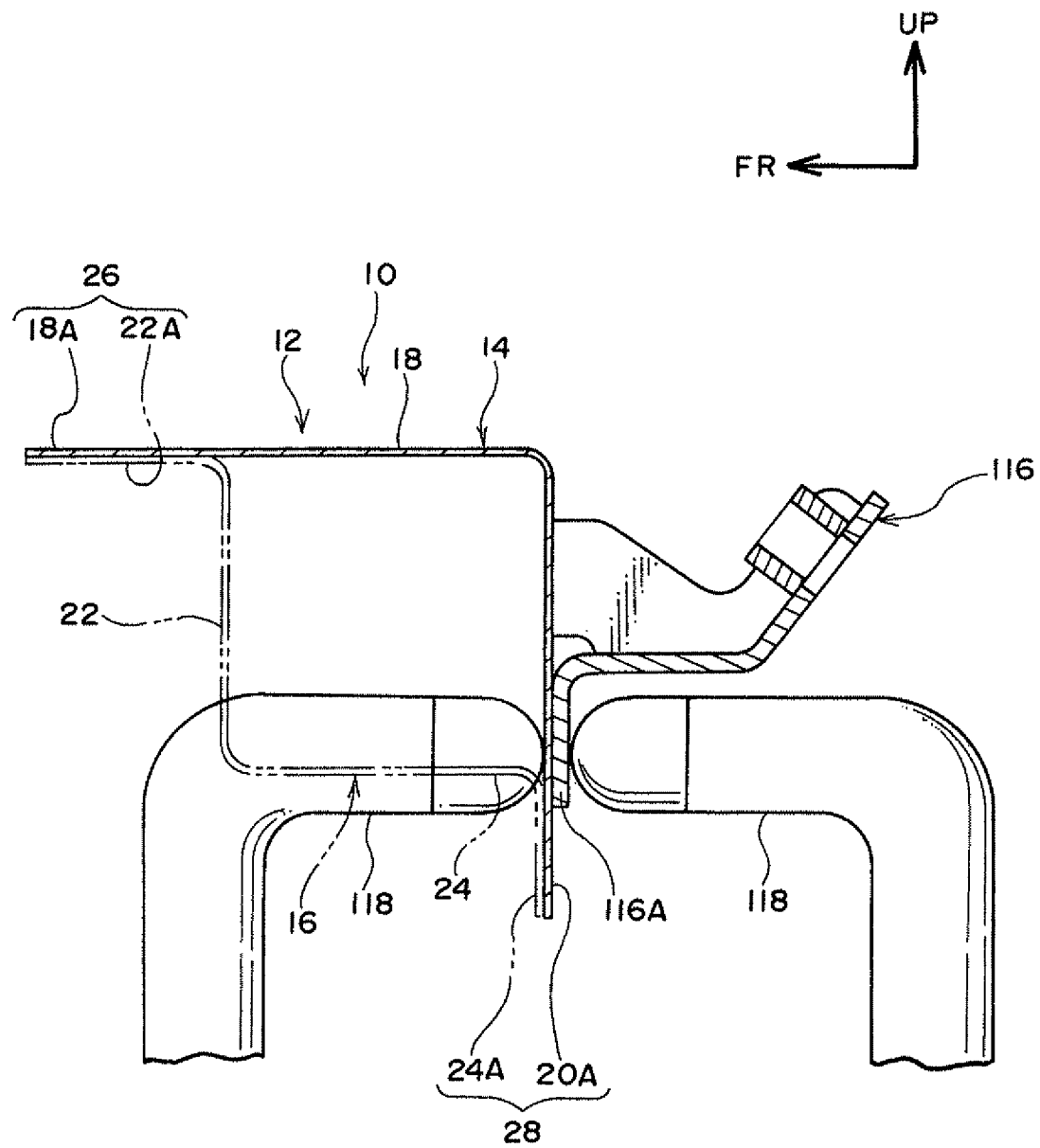
FIG. 10 is an enlarged vertical cross-section illustrating how a passenger seat airbag device is attached to an attachment bracket.

As illustrated in FIG. 1, an attachment bracket 116 for attaching a passenger seat airbag device is provided to the passenger seat side of the instrument panel reinforcement 10 between the passenger seat floor brace 110 and the passenger seat side attachment bracket 30. The attachment bracket 116 has a hat shape as seen in plan view, and, as illustrated in FIG. 10, is formed with attachment flange portions 116A at both side portions and a lower portion. The attachment flange portions 116A are joined to the rear face portion 20 by spot welding. Note that a gun 118 used during spot welding is illustrated in FIG. 10.

A left and right pair of attachment brackets 120 are provided at a vehicle width direction central portion of the instrument panel reinforcement 10. The attachment brackets 120 are brackets for attaching an audio unit. The attachment brackets 120 are joined to the rear face portion 20 by spot welding, similarly to the attachment bracket 116 for attaching the passenger seat airbag device.

Figure 11:
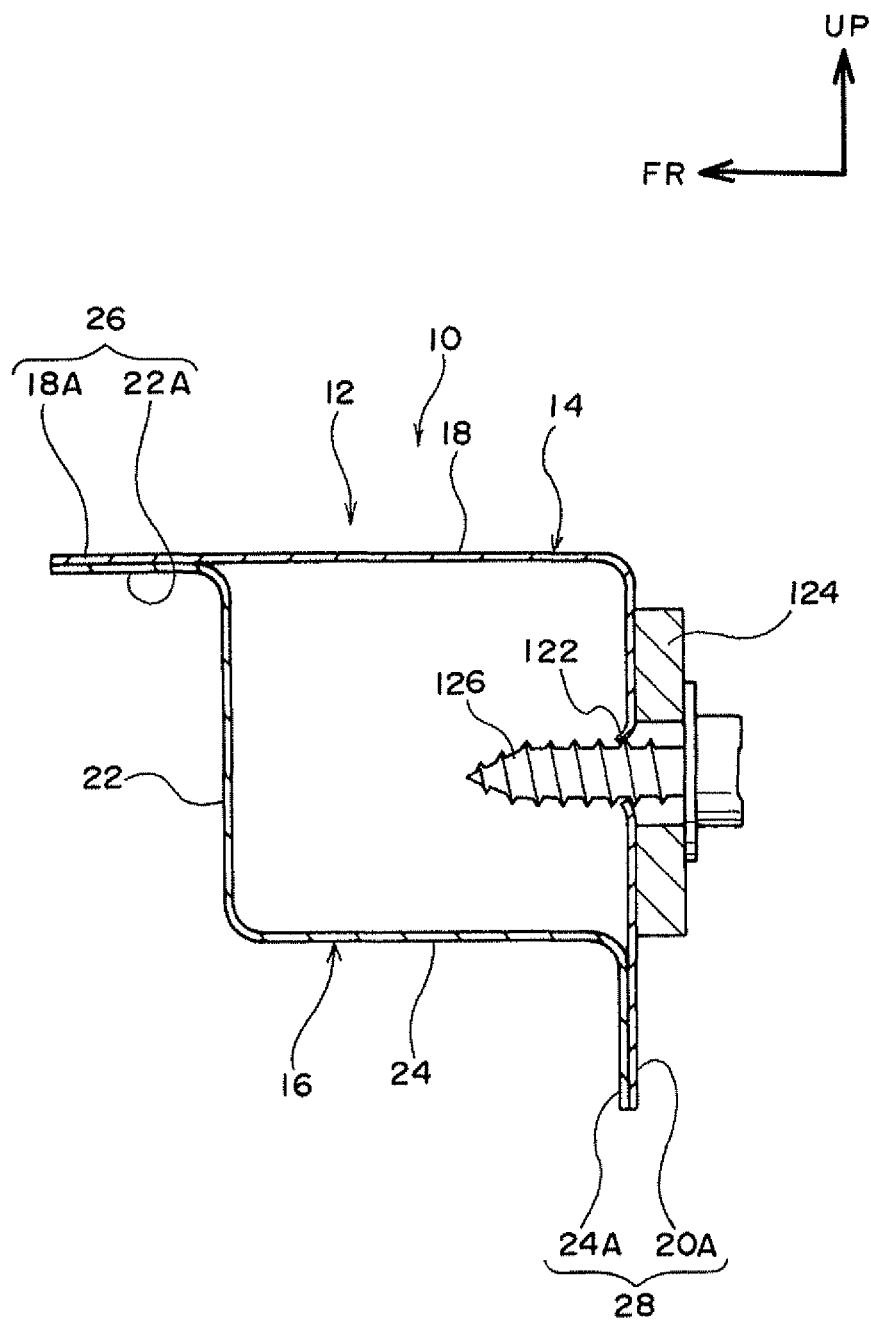
FIG. 11 is an enlarged vertical cross-section illustrating an attachment structure of an instrument panel to instrument panel reinforcement.

As illustrated in FIG. 11, the rear face portion 20 of the instrument panel reinforcement 10 is formed with a burr ring portion 122. An instrument panel 124 is fixed to the burr ring portion 122 with a tapping screw 126.

Figure 12:
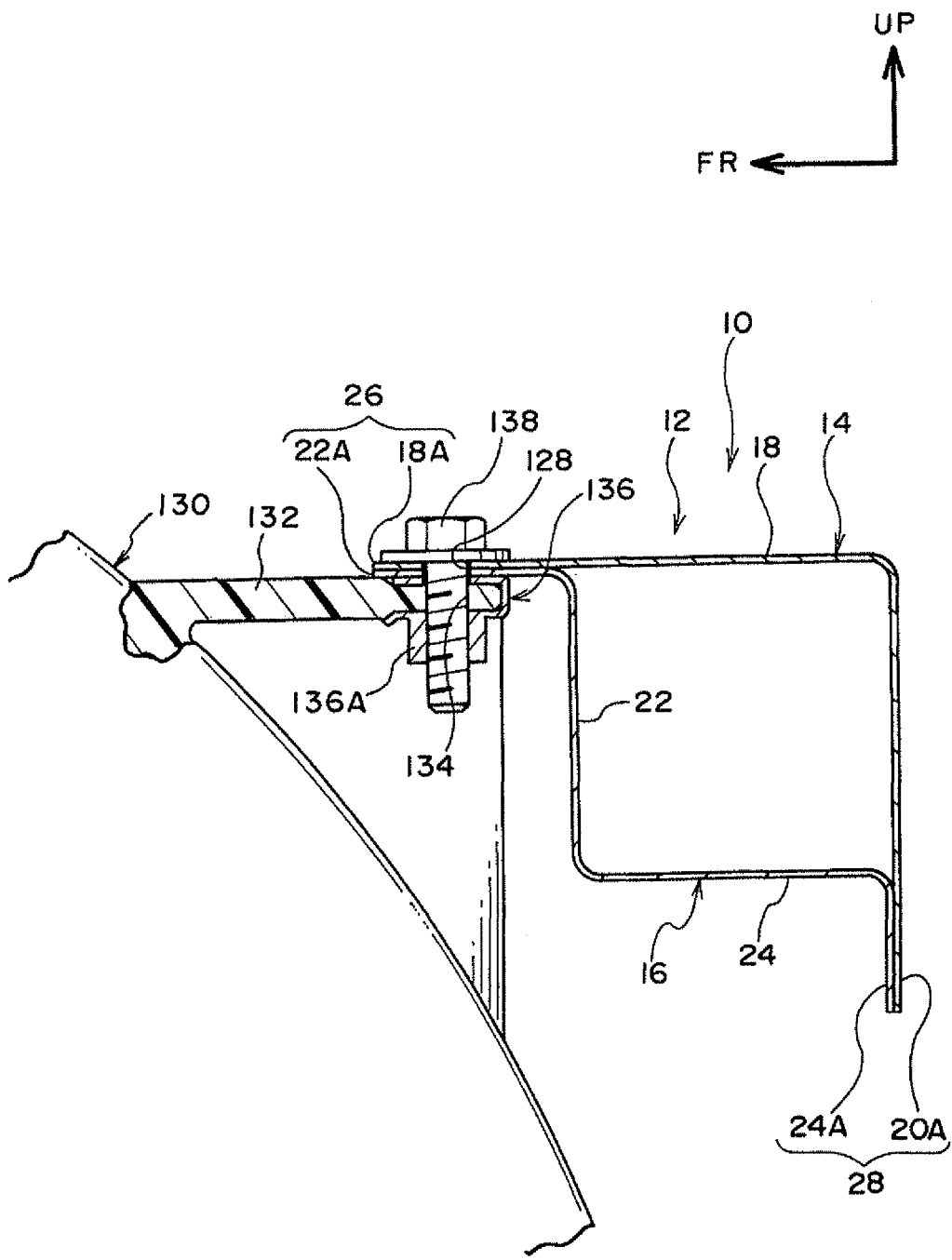
FIG. 12 is an enlarged vertical cross-section illustrating an enlarged attachment structure of a HVAC to instrument panel reinforcement.

As illustrated in FIG. 12, the front-coupling flange portion 26 of the instrument panel reinforcement 10 is formed with a bolt insertion hole 128. An attachment flange 132 of a heating and ventilating air conditioner (HVAC) 130 is disposed below the bolt insertion hole 128. The attachment flange 132 is manufactured from resin, and is formed with a bolt insertion hole 134 coaxial to the bolt insertion hole 128 at a leading end portion and is mounted with a case nut 136. The attachment flange 132 of the HVAC 130 is fastened and fixed by inserting a bolt 138 in sequence through the bolt insertion hole 128 of the front-coupling flange portion 26 and through the bolt insertion hole 134 of the attachment flange 132 of the HVAC 130, and screwing a nut portion 136A of the case nut 136 to the bolt 138.

Figure 13:
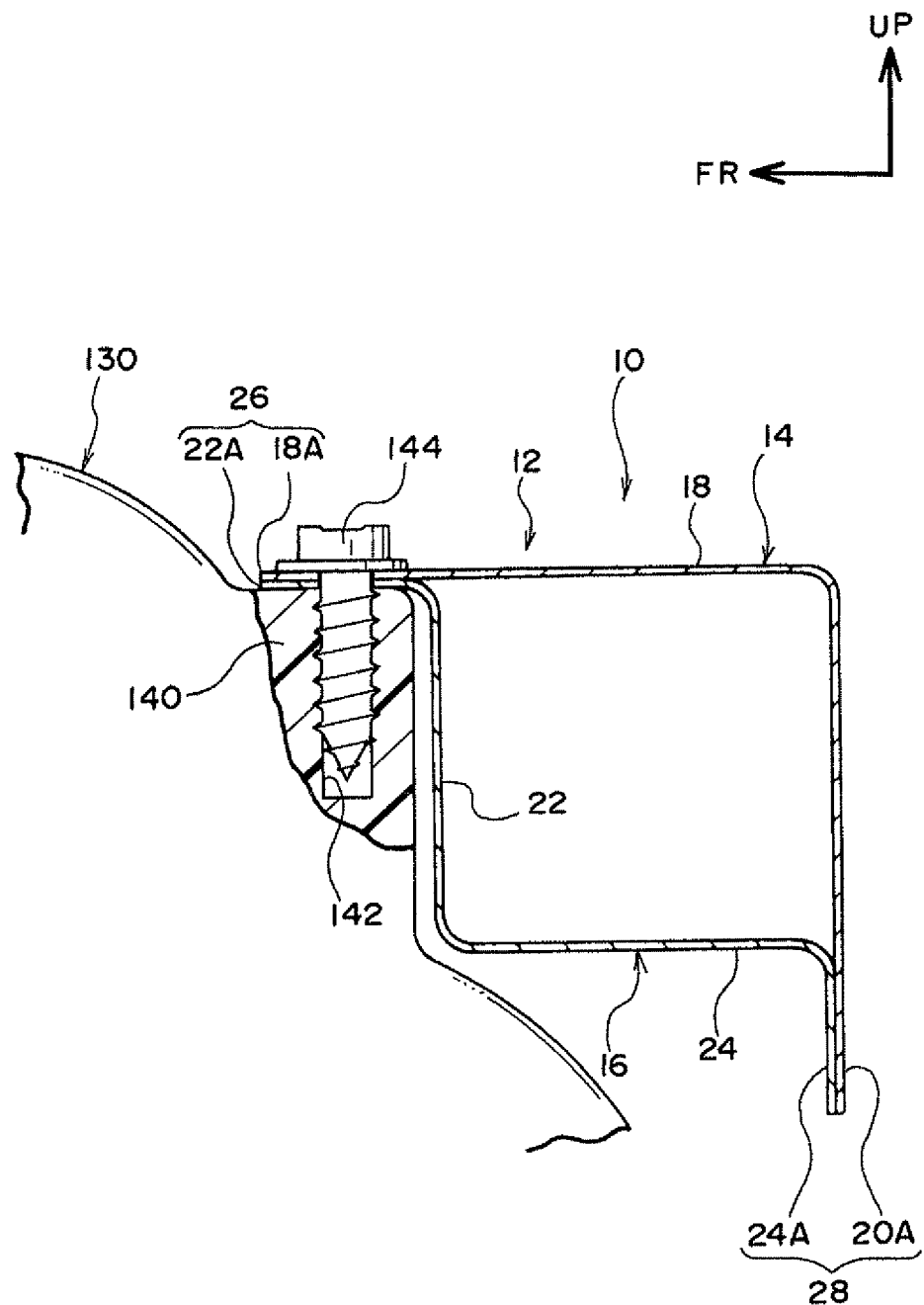
FIG. 13 is an enlarged vertical cross-section corresponding to FIG. 12, illustrating an attachment structure for a HVAC with a different configuration to that of FIG. 12.

As illustrated in FIG. 13, configuration may be made wherein a resin portion 140 of the HVAC 130 is formed with an attachment hole 142, and the front-coupling flange portion 26 fixed to the resin portion 140 with a tapping screw 144.

Operation and Advantageous Effects of the Present Exemplary Embodiment Explanation follows regarding operation and advantageous effects of the present exemplary embodiment.

Basic Operation and Advantageous Effects

In the instrument panel reinforcement 10 configured as described above, the steering column 78 is fixed to the lower side of the steering support bracket 52 using the attachment bolts 76, 82.

Figure 14A:
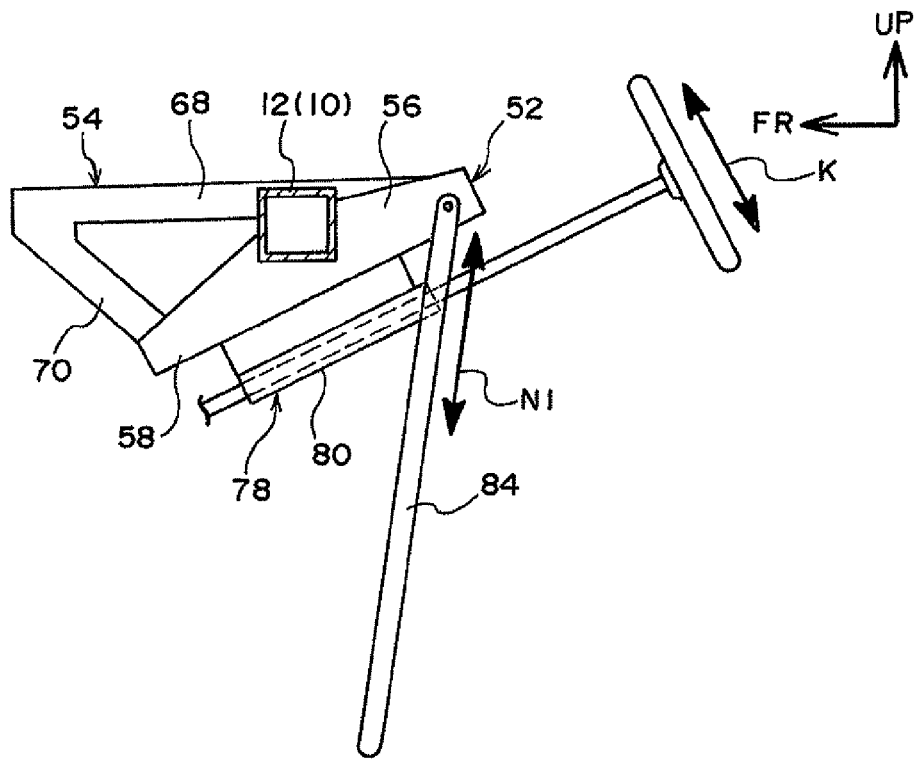
FIG. 14A is a schematic side-on view illustrating a steering column support structure of the present exemplary embodiment, as an explanatory drawing to illustrate advantageous effects of the present exemplary embodiment.
Figure 14B:
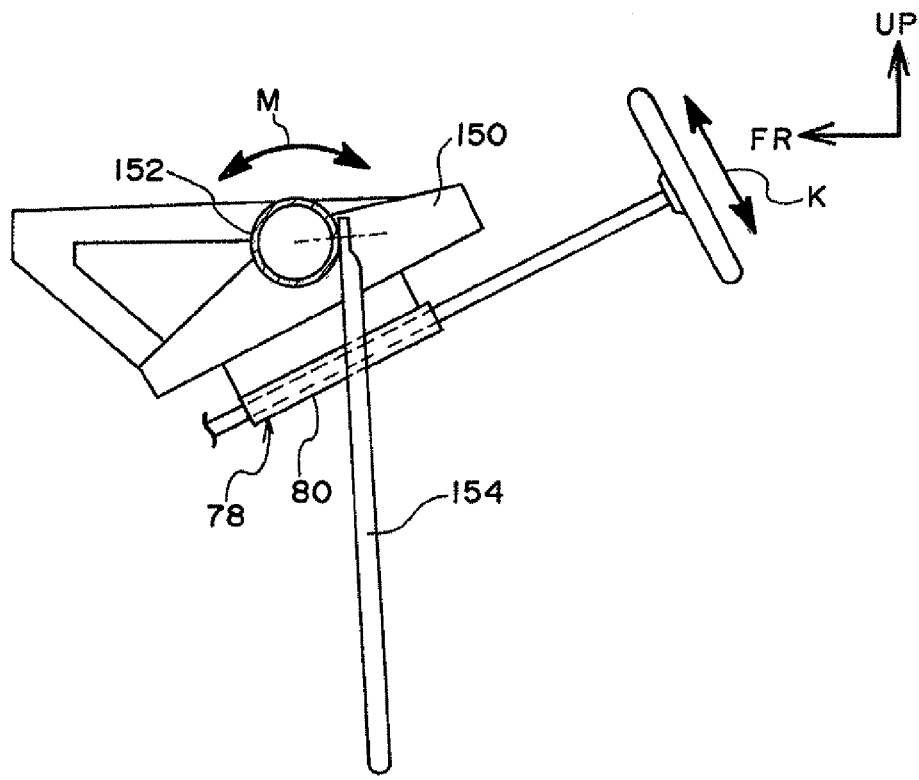
FIG. 14B is a schematic side-on view illustrating a steering column support structure of a comparative example, as an explanatory drawing to illustrate advantageous effects of the present exemplary embodiment.

Hitherto, as illustrated in FIG. 14B, configuration has been adopted wherein a steering column 78 is directly supported by instrument panel reinforcement 152 through a steering support bracket 150. Accordingly, up-down vibration K of the steering column 78 is supported by a torsion force M of the instrument panel reinforcement 152. As a result, it has been necessary to configure the instrument panel reinforcement 152 with a thick plate thickness and employ a large-diameter circular cross-section pipe material to improve the support efficiency of the instrument panel reinforcement 152 to against up-down vibration K of the steering column 78. Note that a floor brace 154 is provided so as to couple the instrument panel reinforcement 152 to the vehicle body floor.

Figure 4:
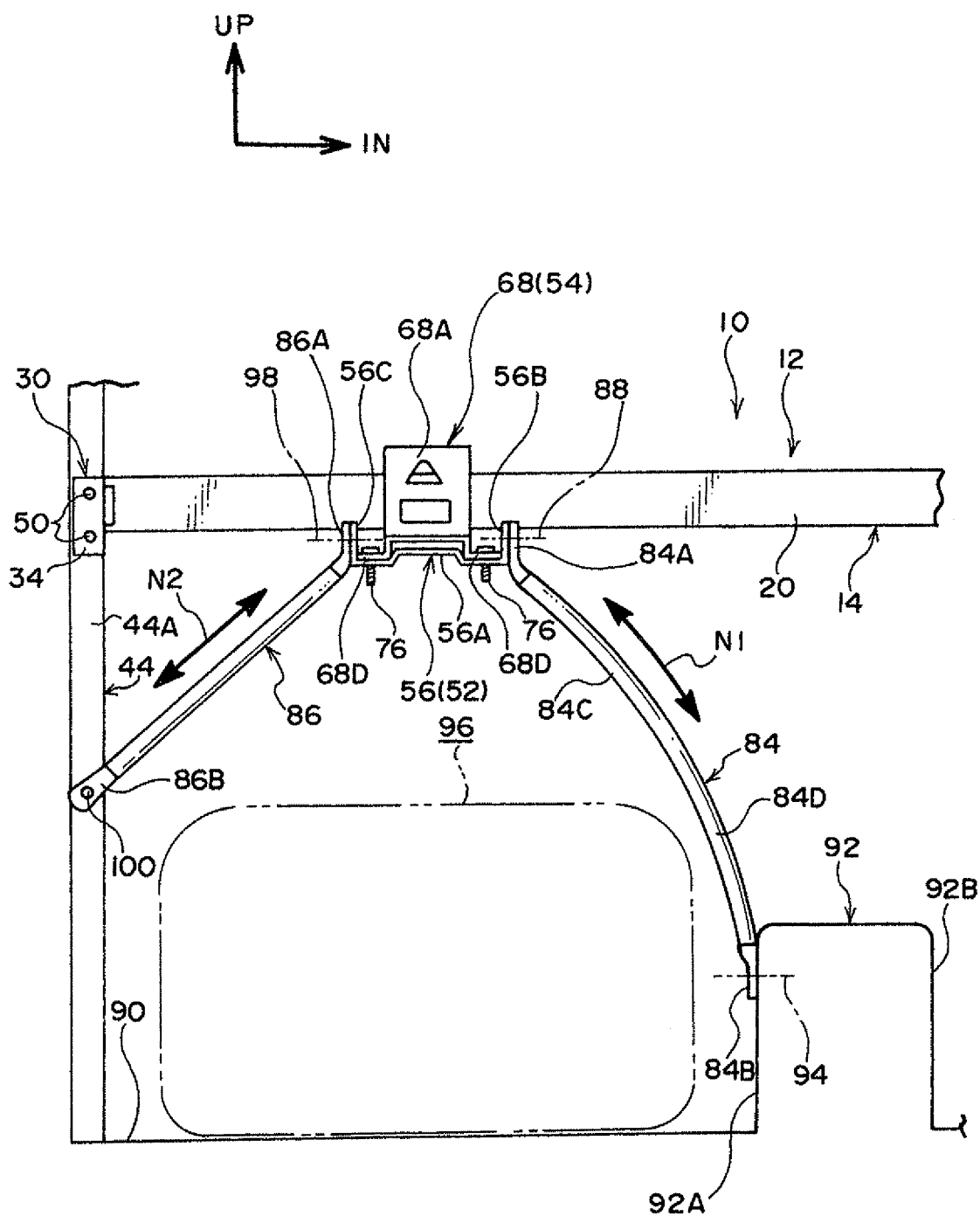
FIG. 4 is a back-face view of the instrument panel reinforcement illustrated in FIG. 1, as seen from an interior side.

By contrast, as illustrated in FIG. 1 and FIG. 4, in the present exemplary embodiment the floor brace 84 spans between the vehicle width direction inside side portion 56B of the first support member 56 and the side wall portion 92A of the floor tunnel portion 92 of the vehicle body floor 90, and the steering brace 86 spans between the vehicle width direction outside side portion 56C of the first support member 56 and a top-bottom direction intermediate portion of the front pillar 44. As illustrated in FIG. 14A, the up-down vibration K of the steering column 78 is thereby supported through the first support member 56 by both an axial force N1 of the floor brace 84 and an axial force N2 (see FIG. 4) of the steering brace 86. Torsion force input to the instrument panel reinforcement 10 is accordingly reduced, enabling a reduction in the support rigidity required from the instrument panel reinforcement 10. As a result, it is possible to configure the instrument panel reinforcement 10 with a reduced plate thickness and a lightweight square shaped cross-section, and the steering column 78 can be efficiently supported.

The above advantageous effects are elaborated on below. It is difficult to abut coupling portions precisely when a sheet material is bent into a pipe shape and the two edge joining portions welded to manufacture pipe material, and welding defects are liable to occur. Accordingly, continuous welding of the coupling portions is required along the entire length of instrument panel reinforcement, adding cost. Moreover, when welding defects are present, such portions have an open cross-section, dramatically reducing the rigidity of instrument panel reinforcement. There is accordingly a need to carry out adequate welding quality control and to carry out remedial action as required. By contrast, in the present exemplary embodiment, the instrument panel reinforcement does not have to bear the up-down vibration K of the steering column 78 using torsion force, since the up-down vibration K is borne by the axial force N1 of the floor brace 84 and the axial force N2 of the steering brace 86. There is accordingly no requirement to configure the instrument panel reinforcement with a circular cross-section, and the instrument panel reinforcement can be configured with a reduced plate thickness by the pressed structural body 12 of square cross-section. As a result, the front-coupling flange portion 26 and the rear-coupling flange portion 28 can be configured such that all points are spot-welded. A great saving in material costs can accordingly be achieved, and great savings can also be made in costs relating to welding such as welding cost and inspection cost, as well as increasing the productivity of the instrument panel reinforcement 10.

Due to configuring the instrument panel reinforcement 10 from the pressed structural body 12 of square cross-section configured by the upper member 14 and the lower member 16, the attachment faces for various components become flat faces rather than curved faces. Accordingly, configurations can be adopted such as the configuration wherein the projection bolt 112 extends out and is directly fastened and fixed to the instrument panel reinforcement 10 (see FIG. 9), the configuration wherein the burr ring portion 122 is directly formed to the rear face portion 20 of the instrument panel reinforcement 10 and directly fastened and fixed using the tapping screw 126 (see FIG. 11), and the configuration wherein the front-coupling flange portion 26 is directly fastened and fixed (see FIG. 12, FIG. 13). That is to say, due to it being possible to employ the front-coupling flange portion 26 and the rear-coupling flange portion 28 for the attachment of peripheral components, an increased range of attachment methods of peripheral components to the instrument panel reinforcement 10 is also achieved. Various brackets required when the instrument panel reinforcement 152 with a circular cross-section is employed can be dispensed with, reducing the number of components and thereby reducing both weight and cost. Moreover, there is also the advantage that damage to the wiring harness from the edge of the flange can be prevented by setting out on the front-coupling flange portion 26 extending towards the vehicle front side when a wiring harness is laid out to the upper face portion 18.

Secondary Operation and Advantageous Effects

As described above, in the present exemplary embodiment the up-down vibration K from the steering column 78 can be supported by both the axial force N1 of the floor brace 84 and the axial force N2 of the steering brace 86, since both the floor brace 84 and the steering brace 86 are provided rather than just one of the two, enabling load input from the steering column 78 to be supported. As a result, sufficient support rigidity can be secured against up-down vibration K of the steering column 78.

Moreover, as illustrated in FIG. 4, the floor brace 84 includes the upper portion 84C and the lower portion 84D, with the upper portion 84C disposed at an incline towards the vehicle width direction outside with respect to the lower portion 84D so as not to sacrifice the pedal work space 96 in comparison to cases in which a floor brace with a straight line shape is disposed so as to be inclined overall. Good pedal operability can be secured as a result.

In the present exemplary embodiment, the plan view L-shaped attachment brackets 30 attached to both length direction end portions of the pressed structural body 12 are fastened and fixed at the vehicle rear side of the front pillars 44. The instrument panel reinforcement 10 is accordingly fixed to the front pillars 44, giving two coupling points. That is to say, in the hitherto known instrument panel reinforcement 152 with a structure that supports up-down vibration from the steering column 78 with the torsional rigidity of the pipe material, it was necessary to fasten and fix the pipe material to the front pillars 44 at least at three locations so as to surround length direction end portions of the pipe material in the circumferential direction. By contrast, in the present exemplary embodiment the required attachment strength can be secured even if the pressed structural body 12 is fastened and fixed to the front pillars 44 at a small number of coupling points (two points), since the up-down vibration K of the steering column 78 is not supported by the torsional rigidity of the instrument panel reinforcement 10. As a result, according to the present exemplary embodiment the attachment productivity of the instrument panel reinforcement 10 to the front pillars 44 can be enhanced, whilst also achieving a reduction in costs.

In the present exemplary embodiment, the extension portions 56F, 56G of the upper edge flange portions 56D, 56E formed to both the side portions 56B, 56C of the first support member 56 of the steering support bracket 52 are superimposed with and fixed to the upper face portion 18 of the pressed structural body 12. Cross-sectional collapse of the instrument panel reinforcement 10 is accordingly suppressed and the rigidity of the instrument panel reinforcement 10 is raised.

In the present exemplary embodiment, the steering support bracket 52 is divided into the first support member 56 that is fixed to the upper member 14, and the second support member 58 that is fixed to the lower member 16 of the pressed structural body 12. It is accordingly possible to pre-attach the first support member 56 to the upper member 14 and pre-attach the second support member 58 to the lower member 16 before the pressed structural body 12 is configured. The attachment precision of the first support member 56 to the upper member 14 and the attachment precision of the second support member 58 to the lower member 16 can therefore be raised. As a result, the attachment precision of the steering column 78 to the steering support bracket 52 can be raised.

Additionally, by extending the second support member 58 towards the first support member 56 side, the second support member 58 can be fixed to the first support member 56 and the two coupled together when the upper member 14 and the 16 are joined together. The first support member 56 and the second support member 58 are accordingly directly coupled together. The overall rigidity of the steering support bracket 52 is increased as a result.

In the present exemplary embodiment, the steering support bracket 52 and the cowl 72 are coupled together in the vehicle front-rear direction by the cowl brace 54. The support rigidity of the steering column 78 can accordingly be increased. Moreover, since the main body portion 68A of the cowl brace 54 heading towards the steering support bracket 52 is configured with a plate shape, and the main body portion 68A is disposed overlapping with the upper face of the bottom portion 56A of the first support member 56, and fastened and fixed to the steering column 78 employing the attachment bolts 76, 82 extending from the main body portion 68A, the plate thickness of the fastened and fixed portion of the steering column 78 is increased due to having a double thickness of the plate thickness of the first support member 56 and the plate thickness of the main body portion 68A of the cowl brace 54. The face rigidity of the fastened and fixed portion of the steering column 78 is accordingly raised. The support rigidity of the steering column 78 can accordingly be raised.

In the present exemplary embodiment, the knee restraint brackets 102, 104 with the knee restraint faces 102B, 104A extending in the vehicle top-bottom direction are respectively attached to a top-bottom direction intermediate portion of the floor brace 84 and a top-bottom direction intermediate portion of the steering brace 86. Accordingly, the vehicle front-rear direction length of the knee restraint brackets 102, 104 can be shortened in comparison to cases in which knee restraint brackets are attached to the instrument panel reinforcement 10. In other words, the length direction (substantially along the vehicle front-rear direction) of the knee restraint brackets 102, 104 can be set short, since the attachment points of the knee restraint brackets 102, 104 to the vehicle body side can be set further to the vehicle rear side than hitherto. As a result, it becomes more difficult for the knee restraint faces 102B, 104A of the knee restraint brackets 102, 104 to shear (escape) in the vehicle top-bottom direction when the knee restraint brackets 102, 104 restrain the knees of an occupant. The occupant knee restraint performance can accordingly be enhanced whilst reducing the size of the knee restraint brackets 102, 104.

Figure 15:
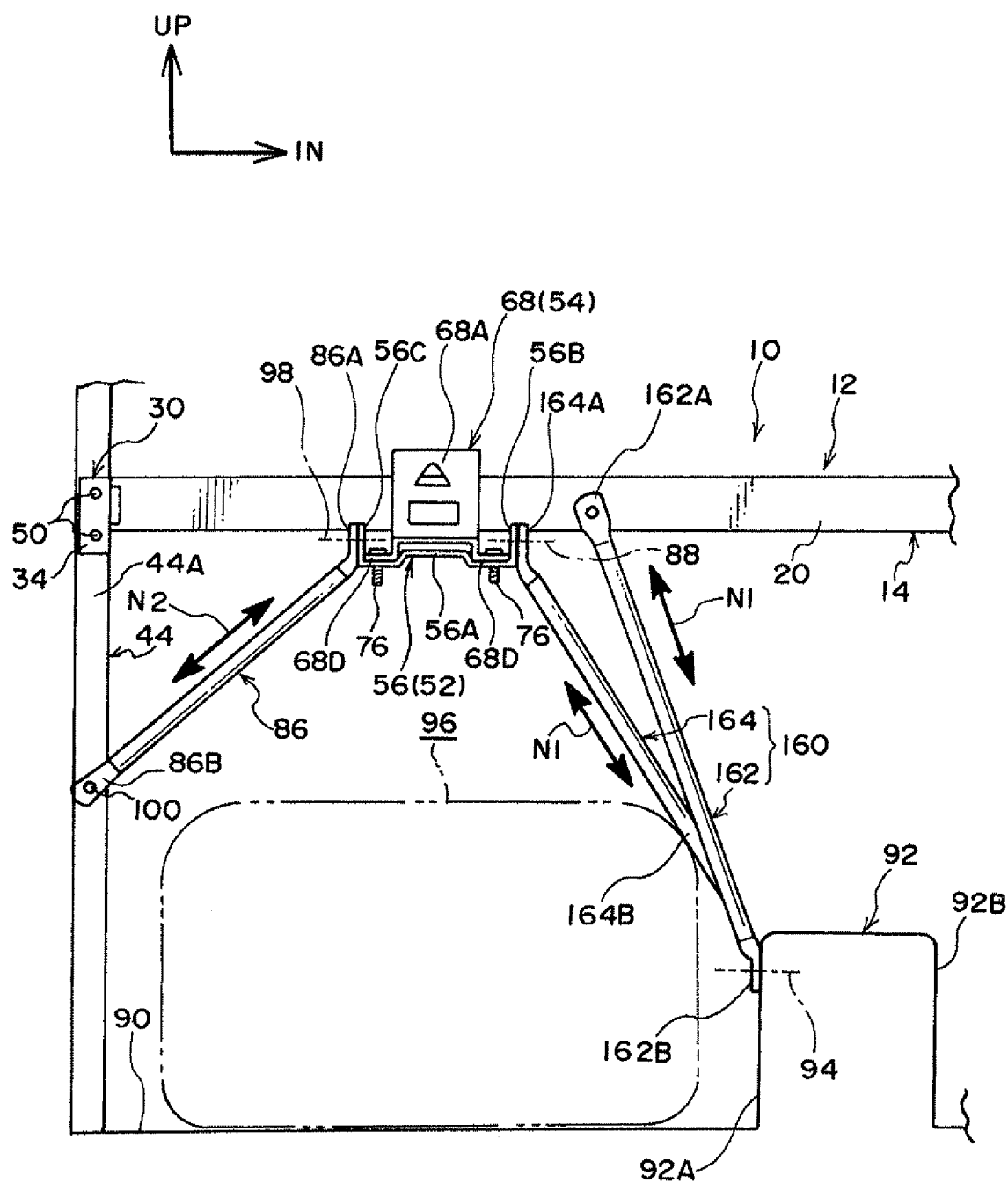
FIG. 15 is a back-face view corresponding to FIG. 4, illustrating a vehicle steering column support structure of a modified example.

Supplementary Explanation of the Above Exemplary Embodiment (1) In the above exemplary embodiment, a configuration is adopted wherein the pedal work space 96 is secured by a single floor brace 84 by bending the floor brace 84 at a top-bottom direction intermediate portion, however there is no limitation thereto. As illustrated in FIG. 15, a configuration may be adopted wherein a floor brace is divided into plural rods. To put it simply, in this modified example, as illustrated in FIG. 15, a floor brace 160 is configured by a first floor brace 162 and a second floor brace 164. The first floor brace is known technology, with a top end portion 162A thereof fastened and fixed to the rear face portion 20 of the instrument panel reinforcement 10. A bottom end portion 162B is fastened and fixed to the side wall portion 92A of the floor tunnel portion 92. However, a top end portion 164A of the second floor brace 164 is fastened and fixed to the vehicle width direction inside side portion 56B of the first support member 56. A bottom end portion 164B is fixed by for example welding to a top-bottom direction mid-way location (between the top-bottom direction intermediate portion and the bottom end portion 162B) of the first floor brace 162. Such a configuration still secures the pedal work space 96 similarly to in the exemplary embodiment described above, thereby securing good pedal operability.

(2) In the above exemplary embodiment, the instrument panel reinforcement 10 is configured such that the upper member 14, with an L-shaped cross-section as taken along a direction orthogonal to the length direction, is disposed at the upper portion of the square shaped cross-section, and the lower member 16, substantially M-shaped in the same cross-section, is disposed at the lower portion of the square shaped cross-section. There is however no limitation thereto, and other cross-section structures may be employed, albeit with reduced benefits. For example, the front-rear disposal relationship of the upper member 14 and the lower member 16 may be reversed. In such cases, although there would be limitations to the design of the instrument panel 124, and it would no longer be possible to attach the HVAC 130 making use of the front-coupling flange portion 26, the same basic advantageous effects would still be obtained since the attachment between the floor brace 84 and the steering brace 86 would not be affected. Configuration can also be made for example with a cross-section shape with the height of the front coupling-flange portion reduced (a square shaped cross-section not divided into two by a diagonal line) by bending the front edge portion of the upper face of the upper member further to the vehicle front side after bending towards the vehicle bottom side, and reducing the height of the front face portion of the lower member.

(3) In the above exemplary embodiment, the top end portion 84A of the floor brace 84 is fixed to the vehicle width direction inside side portion 56B of the first support member 56 of the steering support bracket 52, and the top end portion 86A of the steering brace 86 is fixed to the vehicle width direction outside side portion 56C of the first support member 56 (namely, the top end portion 84A of the floor brace 84 and the top end portion 86A of the steering brace 86 are fixed on either side of the steering support bracket 52). There is however no limitation thereto, and the top end portion of the floor brace and the top end portion of the steering brace may be fixed to a rear portion of the steering support bracket.

The invention claimed is:

1. A vehicle steering column support structure for a vehicle having a steering column, the vehicle steering column support structure comprising:
an instrument panel reinforcement disposed along a vehicle width direction between left and right front pillars and configured as a pressed structural body to which a steering support bracket is fixed that is configured to support the steering column; and
a floor brace including:
a top end portion fixed to a rear portion of the steering support bracket,
a bottom end portion fixed to a vehicle body floor, and
a steering brace with a top end portion fixed to a rear portion of the steering support bracket and a bottom end portion fixed to the lower portion of one of the left or right front pillars, wherein:
the pressed structural body includes an upper member that configures an upper section side of a square cross-section and that is formed of metal where the upper member is integral from a driver's seat side to a passenger seat side, and a lower member that configures a lower section side of the square cross-section and that is formed of metal where the lower member is integral from the driver's seat side to the passenger seat side;
the steering support bracket includes: (i) a first support member fixed to the upper member and upon which the top end portion of the floor brace is fixed, and (ii) a second support member fixed to the lower member and extends towards the first support member side and is fixed to the first support member; and
the steering support bracket and a cowl are coupled in a vehicle front-rear direction by a cowl brace that is attached to the first support member and attached to the second support member.

2. The vehicle steering column support structure of claim 1, wherein:
attachment brackets that are L-shaped in plan view are respectively fixed to both length direction end portions of the pressed structural body; and
the attachment brackets are fastened and fixed to the front pillars from a vehicle rear side.

3. The vehicle steering column support structure of claim 1, wherein:
joining flange portions that overlap with an upper face of the pressed structural body are respectively formed at both side portions of the steering support bracket; and
the joining flange portions are fixed to the upper face of the pressed structural body.

4. The vehicle steering column support structure of claim 1, wherein:
an attachment portion of the cowl brace to the steering support bracket is formed in a plate shape and disposed overlapping an upper face of the steering support bracket, and the steering column is fastened and fixed employing a stud bolt that extends downwards from the attachment portion.

5. The vehicle steering column support structure of claim 1, wherein the floor brace comprises:
the top end portion fixed to the instrument panel reinforcement and the bottom end portion fixed to a vehicle width direction central portion of the vehicle body floor; and
another floor brace with a top end portion fixed to a rear portion of the steering support bracket and a bottom end portion fixed to a top-bottom direction mid-way location of the floor brace.

6. The vehicle steering column support structure of claim 1, wherein the pressed structural body comprises:
- a rear-coupling flange portion that is front-rear superimposed and extends towards a vehicle bottom side, and
- a front-coupling flange portion that is top-bottom superimposed and extends towards a vehicle front side.

7. The vehicle steering column support structure of claim 6, wherein the pressed structural body is spot welded respectively at the rear-coupling flange portion and at the front-coupling flange portion.

8. The vehicle steering column support structure of claim 1, wherein the floor brace comprises:
- the top end portion fixed to the rear portion of the steering support bracket and the bottom end portion fixed to a vehicle width direction central portion of the vehicle body floor.

9. The vehicle steering column support structure of claim 8, wherein the floor brace comprises:
- an upper portion from the top end portion to a top-bottom direction intermediate portion, and
- a lower portion from the top-bottom direction intermediate portion to the bottom end portion, wherein the upper portion is disposed so as to be inclined towards the vehicle width direction outside with respect to the lower portion.

10. The vehicle steering column support structure of claim 8, wherein a knee restraint bracket with a knee restraint face extending along the vehicle top-bottom direction is attached to a top-bottom direction intermediate portion of the floor brace and to a top-bottom direction intermediate portion of the steering brace.

* * * * *